US009762280B1

(12) United States Patent
Munn

(10) Patent No.: US 9,762,280 B1
(45) Date of Patent: Sep. 12, 2017

(54) PORTABLE MOBILE PHONE HOLDERS AND METHODS FOR OPERATING AT LEAST TWO MOBILE PHONES

(71) Applicant: Jordan C. Munn, Troy, NY (US)

(72) Inventor: Jordan C. Munn, Troy, NY (US)

( * ) Notice: Subject to any disclaimer, the term of this patent is extended or adjusted under 35 U.S.C. 154(b) by 0 days.

(21) Appl. No.: 14/966,123

(22) Filed: Dec. 11, 2015

Related U.S. Application Data

(60) Provisional application No. 62/090,451, filed on Dec. 11, 2014.

(51) Int. Cl.
*H04B 1/3888* (2015.01)
*H04M 1/04* (2006.01)

(52) U.S. Cl.
CPC ............ *H04B 1/3888* (2013.01); *H04M 1/04* (2013.01)

(58) Field of Classification Search
CPC ...... H04B 1/3888; H04M 1/04; H04M 1/0283
USPC ............................................ 455/575.1, 575.8
See application file for complete search history.

(56) References Cited

U.S. PATENT DOCUMENTS

| | | | |
|---|---|---|---|
| 8,763,795 B1 * | 7/2014 | Oten ...................... | A45C 11/00 206/320 |
| 8,960,634 B2 | 2/2015 | Le Gette et al. | |
| 9,004,333 B2 | 4/2015 | Monaco et al. | |
| 2005/0243522 A1 * | 11/2005 | Nilsen .................. | H04B 1/3816 361/716 |
| 2011/0204843 A1 * | 8/2011 | Foster .................... | A45C 11/00 320/101 |
| 2012/0244920 A1 | 9/2012 | Lee | |
| 2015/0111624 A1 * | 4/2015 | Peel ..................... | H04B 1/3877 455/575.8 |

OTHER PUBLICATIONS

AliExpress Webpage, "New Cell phone Wallet leather Purse Smart hold 2 Phones Case" [www.aliexpress.com/item/New-Cell-phone-Wallet-leather-Purse-Smart-hold-2-Phones-Case-BAG-for-Samsung-Galaxy-Note/1995708377.html], accessed: Dec. 30, 2015; published: unkonwn.
Story Leather Webpage, "Double Decker" phone case for 2 phones, [http://www.storyleather.com/smart-phone-cases/custom-made-phone-cases/double-decker.html], accessed: Dec. 30, 2015; published: Oct. 9, 2014 via "Wayback Machine".
Amazon "Tuo-Phone" case, accessible online at least on Nov. 30, 2014.
Applicant's Facebook Posts for Invention, Nov. 2014, 4pp.

* cited by examiner

*Primary Examiner* — Christopher M Brandt
(74) *Attorney, Agent, or Firm* — Tech Valley Patent, LLC; John Pietrangelo

(57) ABSTRACT

Portable mobile phone holders that permit the substantially simultaneous use or access of two or more mobile phones are provided. The holders include a foldable structure having a first panel and a second panel that are rotatable between a closed position and one or more open positions, a first mobile phone retaining device mounted on the first panel, and a second mobile phone retaining device mounted on the second panel. When the foldable structure is opened, the first mobile phone retaining device and the second mobile phone retaining device are accessible. In addition, the mobile phones mounted in the mobile phone retaining devices are also accessible. The phone holders may include one or more third panels that protect the mobile phones when the holders are closed. Methods of using mobile phones, holders for other mobile devices, and kits for providing mobile phone holders are also provided.

20 Claims, 15 Drawing Sheets

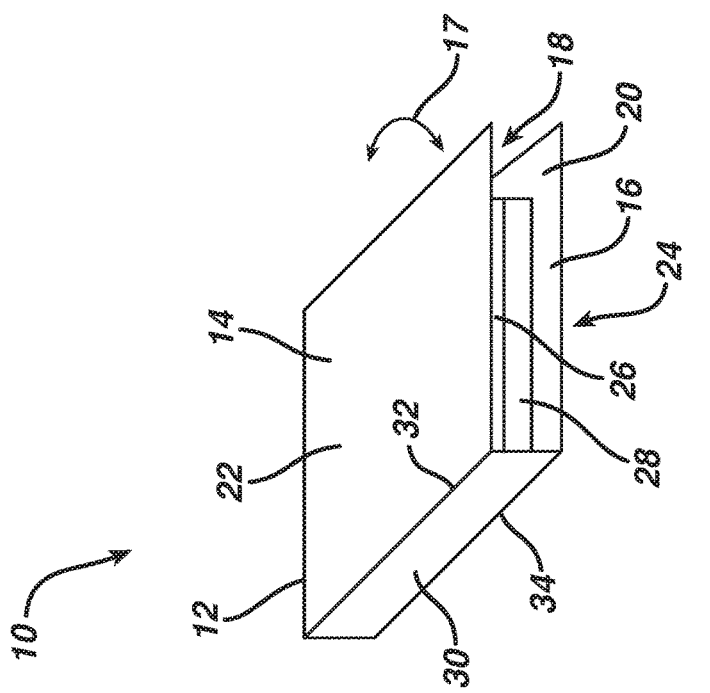
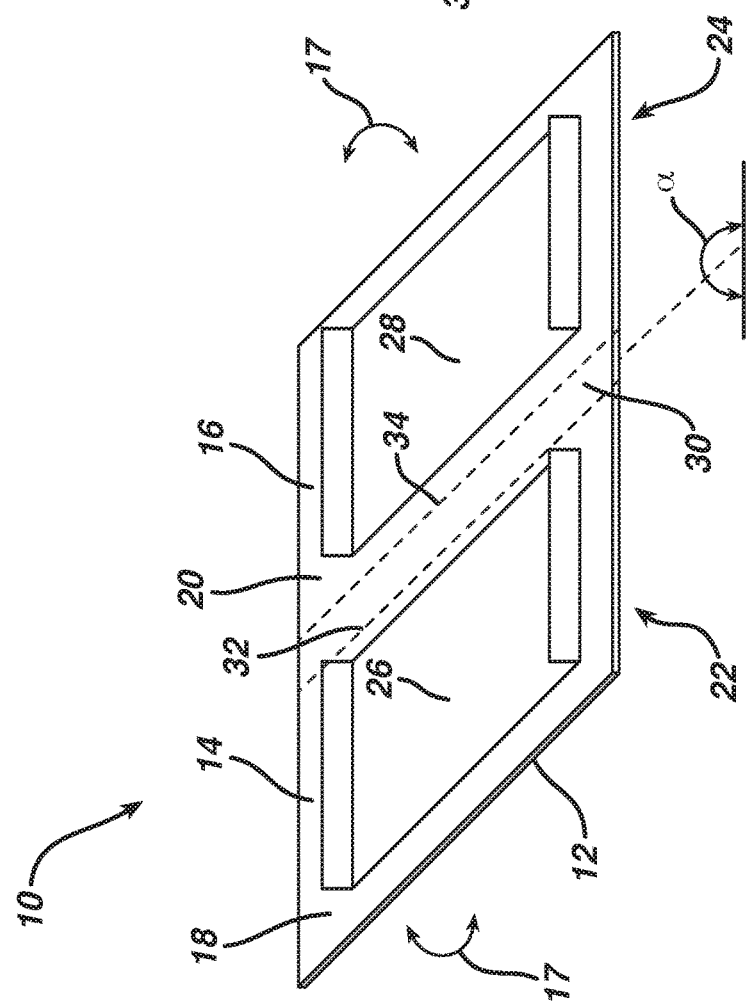

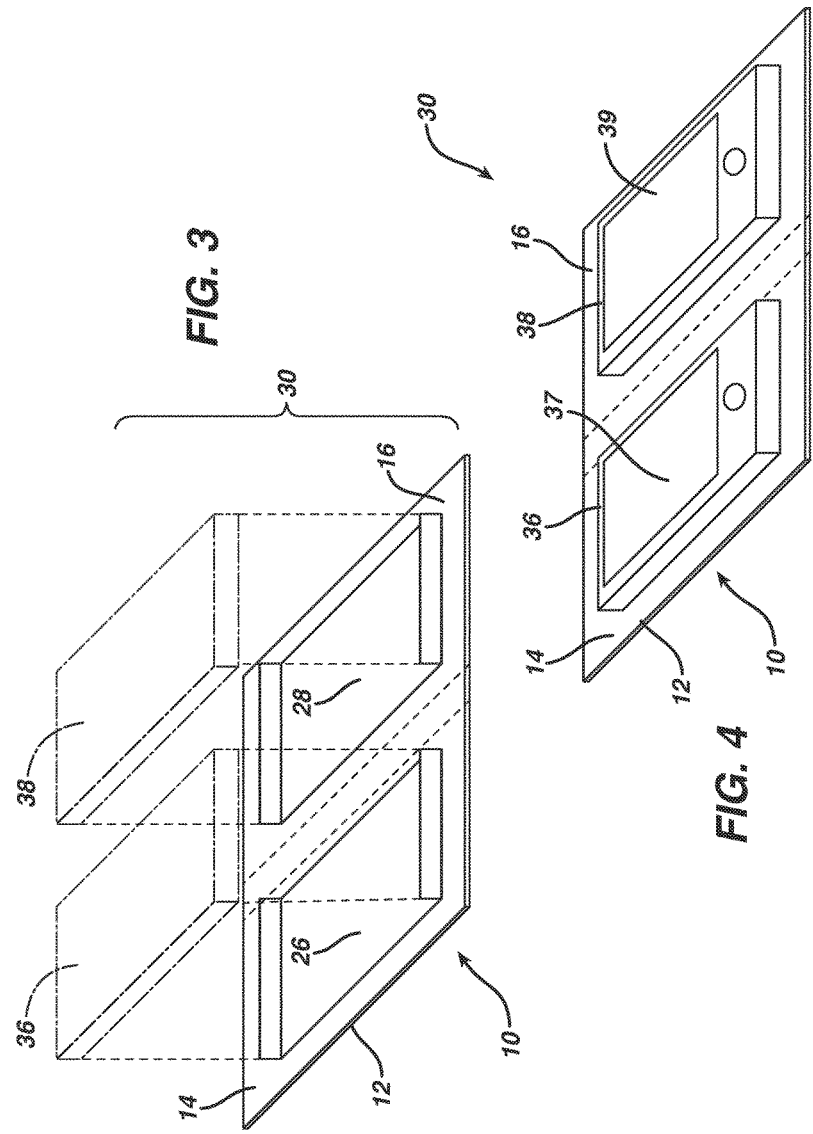

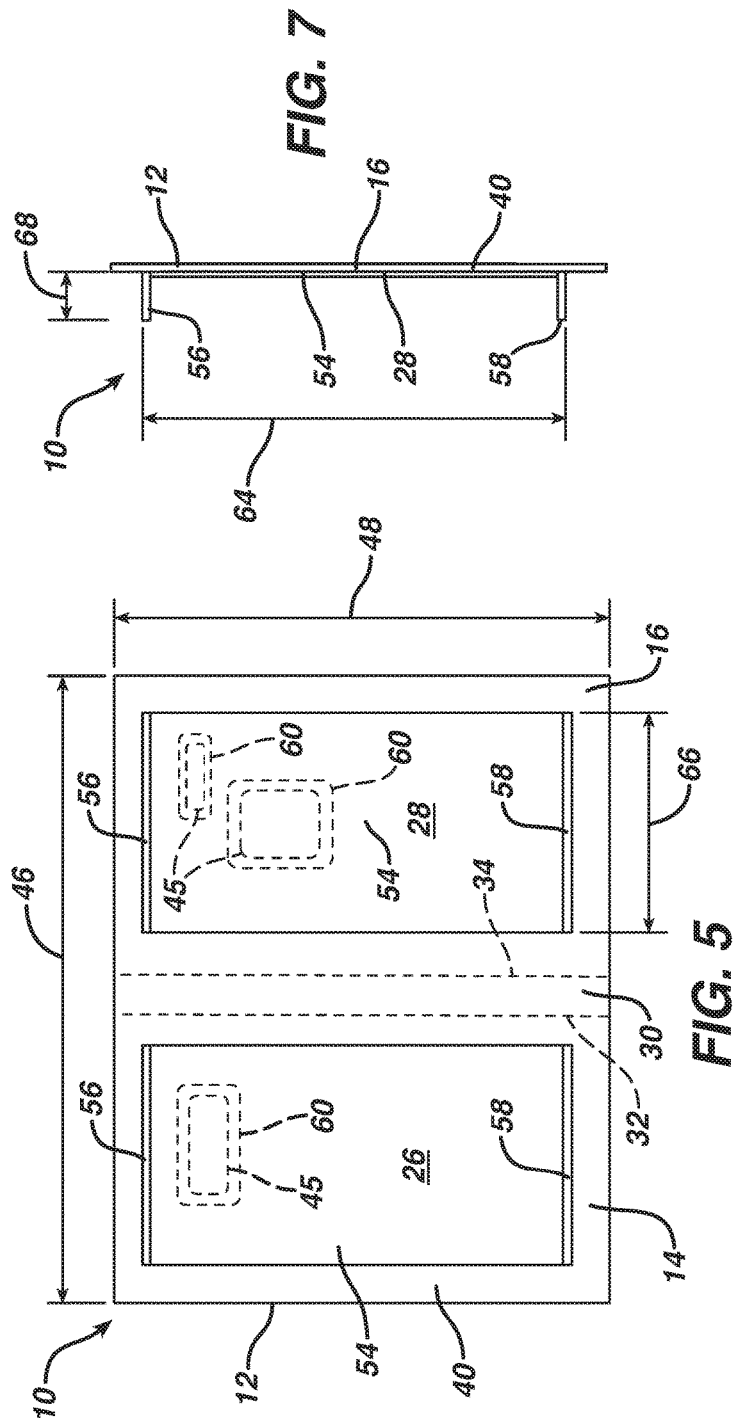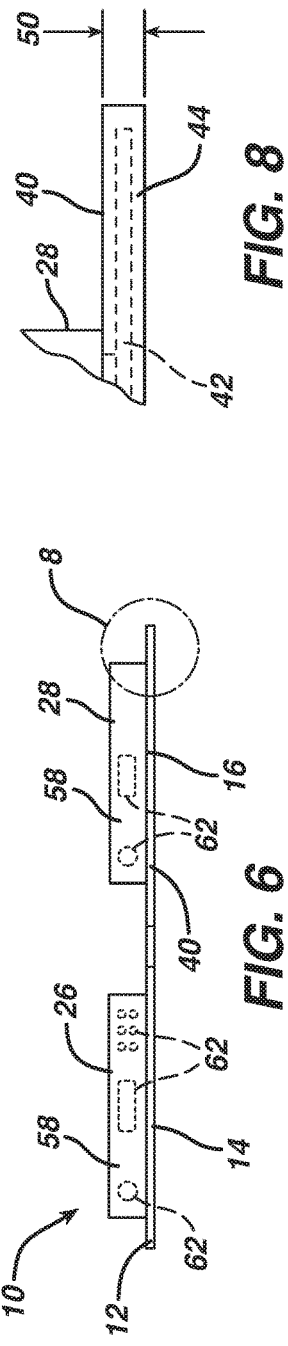

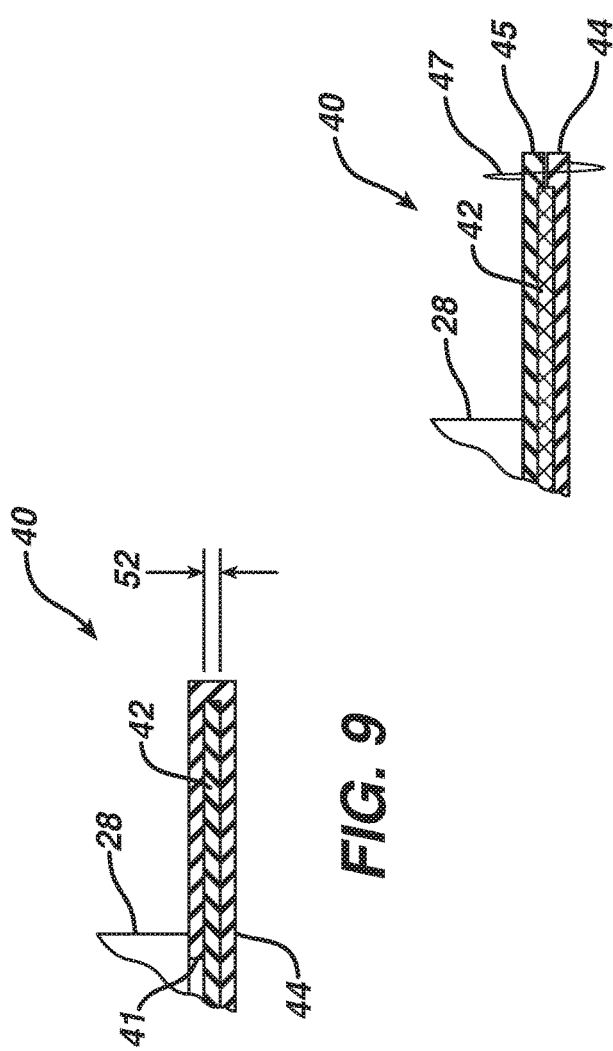
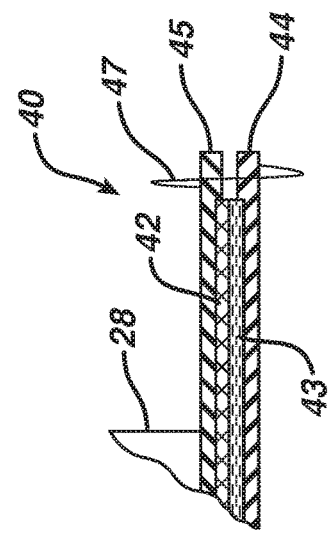
FIG. 9
FIG. 9A
FIG. 9B

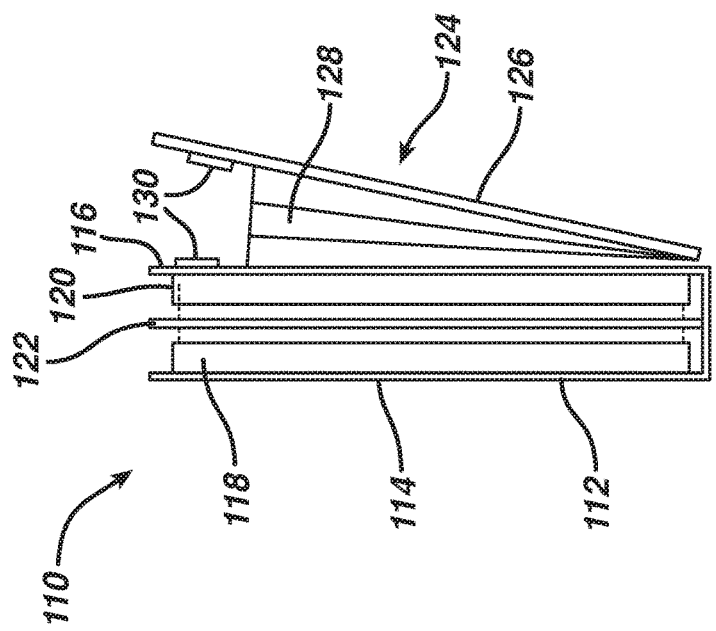
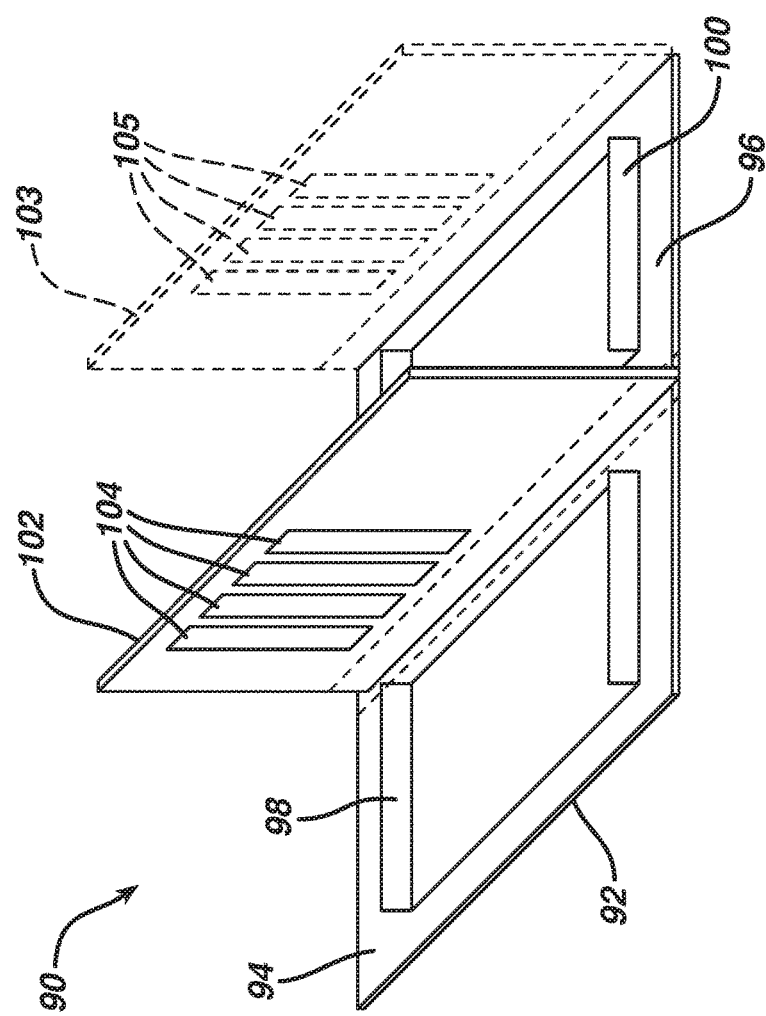
FIG. 13
FIG. 12

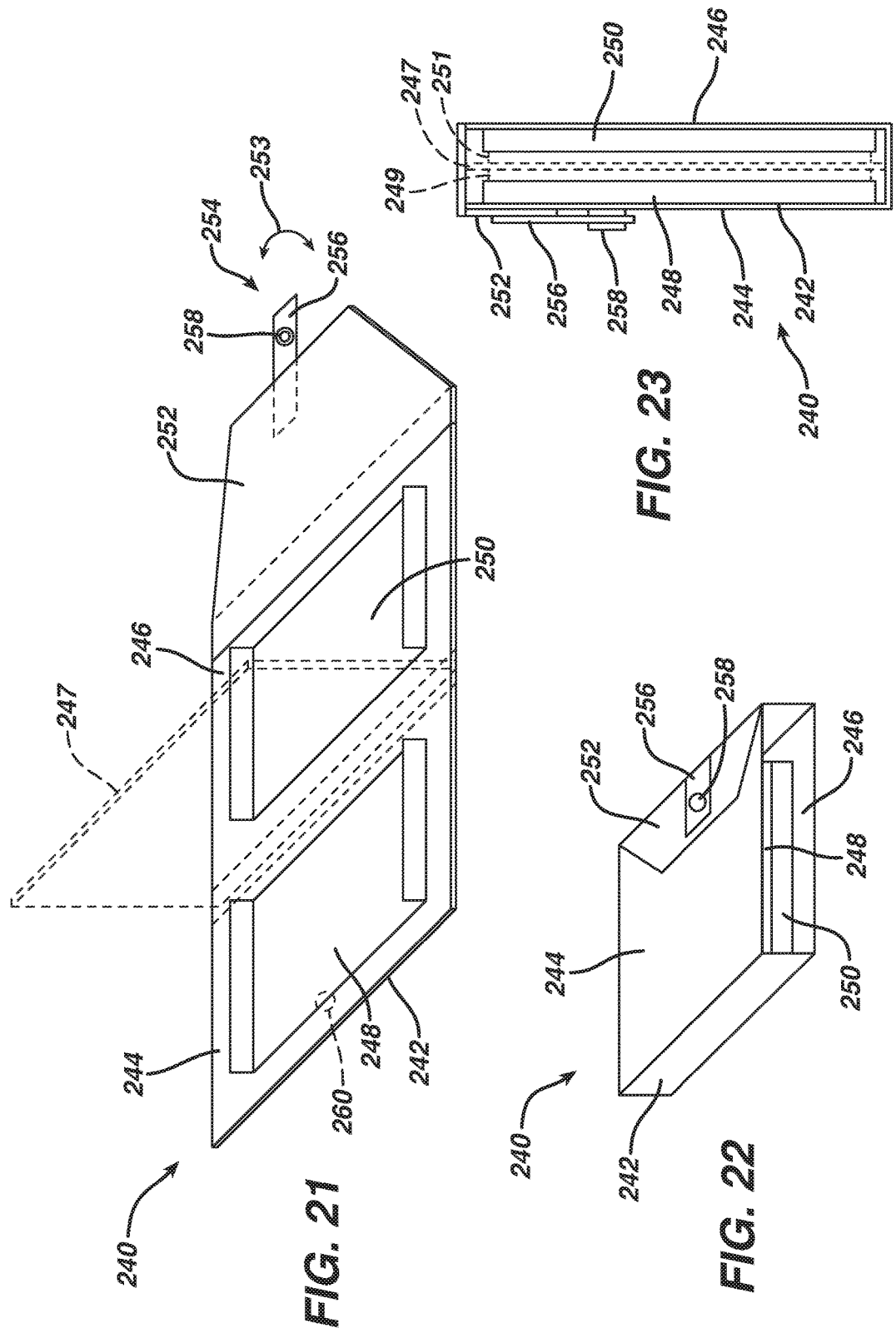

PORTABLE MOBILE PHONE HOLDERS AND METHODS FOR OPERATING AT LEAST TWO MOBILE PHONES

CROSS-REFERENCE TO RELATED APPLICATIONS

This application claims priority from U.S. Provisional Patent Application 62/090,451, filed on Dec. 11, 2014, the disclosure of which is included by reference herein in its entirety.

BACKGROUND OF THE INVENTION

Technical Field

The present invention generally relates to holders or cases for mobile phones or other electronic or non-electronic devices. More particularly, the present invention relates to holders for two or more mobile phones or other devices which permit the access and use of the phones or devices at substantially the same time.

Description of Related Art

Prior art mobile phone carrying cases are typically designed to carry a single mobile phone. However, for those who carry multiple mobile phones or multiple electronic devices, it is presently difficult to be able to carry the multiple devices without the danger of dropping or mishandling one of the devices. In addition, with prior art holders limited to single devices, it is difficult to hold and use more than one while holding another device, and also difficult to hold both devices, for example, both phones, so that the devices can be used simultaneously.

Accordingly, there is a need in the art for a mobile phone or mobile device holders and methods of operating such devices that allow holding multiple devices. For example, there is a need to provide holders and methods that permit the handling and use of multiple devices at the same time.

SUMMARY OF THE INVENTION

Aspects of the present invention address these and other limitations of the prior art. Disclosed herein are mobile phone cases or holders and methods for operating mobile phones that allows two (or more) mobile phones to be carried securely and used substantially simultaneously. The use of the phones may include using the phone features of the two or more phones, using the video or camera features of the two or more phones, and using the social networking features available on two or more phones, and/or using the or internet access features available on the two or more phones. Aspects of the invention may include mobile phone retaining devices (or sub-cases) for two or more phones that are mounted to a foldable structure having panels, for example, panels comprising rigid or semi-rigid materials. When the foldable structure is folded, the phones can be contained with the folded structure and, for example, with their displays facing each other.

One embodiment of the invention is a portable mobile phone holder comprising or including a foldable structure comprising a first panel and a second panel, wherein at least one of the first panel and the second panel is rotatable between a closed position and one or more open positions, and wherein, in the closed position, an interior side of the first panel faces an interior side of the second panel; a first mobile phone retaining device mounted on the interior side of the first panel; and a second mobile phone retaining device mounted on the interior side of the second panel; wherein, when the foldable structure is positioned in an open position, the first mobile phone retaining device and the second mobile phone retaining device are accessible. In one aspect, when a first mobile phone is mounted in the first mobile phone retaining device and a second mobile phone is mounted in the second mobile phone retaining device, and wherein the foldable structure is positioned in the open position, a user interface of each of the first mobile phone and of the second mobile phone may be accessible by a user.

In another aspect, the foldable structure further may further comprise at least one third panel mounted to the structure. The at least one third panel may mounted between the first panel and the second panel, and/or the at least one third panel may be mounted to a periphery of one of the first panel and the second panel.

In another aspect, the first mobile phone retaining device and the second mobile phone retaining device each may each comprise an enclosure shaped to engage a mobile phone.

In one aspect, the foldable structure may further comprises at least one cavity, for example, a purse and/or a card holder.

Another embodiment of the invention is a method for operating at least two mobile phones, the method comprising or including: providing a foldable structure comprising a first panel and a second panel, wherein at least one of the first panel and the second panel is rotatable between a closed position and one or more open positions, and wherein, in the closed position, an interior side of the first panel faces an interior side of the second panel; inserting a first mobile phone into a first mobile phone retaining device mounted on the interior side of the first panel; inserting a second mobile phone into a second mobile phone retaining device mounted on the interior side of the second panel; rotating at least one of the first panel and the second panel into one of the one or more open positions; and accessing a user interface of the first mobile phone and accessing a user interface of the second mobile phone. In one aspect, accessing the user interface of the first mobile phone and accessing the user interface of the second mobile phone comprises substantially simultaneously accessing the user interface of the first mobile phone and the user interface of the second mobile phone.

In one aspect, the method may also include preventing contact between the first mobile phone and the second mobile phone. For example, the foldable structure further may comprise a third panel, and wherein preventing contact between the first mobile phone and the second mobile phone may be practiced by positioning the third panel between the first mobile phone and the second mobile phone.

A further embodiment of the invention is a portable electronic device holder comprising or including: a foldable structure comprising a first panel and a second panel, wherein at least one of the first panel and the second panel is rotatable between a closed position and one or more open positions, and wherein, in the closed position, an interior side of the first panel faces an interior side of the second panel; a first electronic device retaining device mounted on the interior side of the first panel; and a second electronic device retaining device mounted on the interior side of the second panel; wherein, when the foldable structure is positioned in an open position, the first electronic device retaining device and the second electronic device retaining device are accessible. In one aspect, at least one of the first electronic device and the second electronic device comprises a mobile phone, a personal digital assistant, a video player, a music player, an electronic book, an electronic tablet, or a computer.

In one aspect, when a first electronic device is mounted in the first electronic device retaining device and a second electronic device is mounted in the second electronic device retaining device, and wherein the first panel and the second panel are positioned in one of the open positions, a user interface of each of the first electronic device and of the second electronic device is accessible by a user.

Another embodiment of the invention is a method for operating at least two electronic devices, the method comprising or including: providing a foldable structure comprising a first panel and a second panel, wherein at least one of the first panel and the second panel is rotatable between a closed position and one or more open positions, and wherein, in the closed position, an interior side of the first panel faces an interior side of the second panel; inserting a first electronic device into a first electronic device retaining device mounted on the interior side of the first panel; inserting a second electronic device into a second electronic device retaining device mounted on the interior side of the second panel; rotating at least one of the first panel and the second panel into one of the one or more open positions; and accessing a user interface of the first electronic device and accessing a user interface of the second electronic device. The first electronic device and the second electronic device may be a mobile phone, a personal digital assistant, a video player, a music player, an electronic book, an electronic tablet, or a computer.

In one aspect, accessing the user interface of the first electronic device and accessing the user interface of the second electronic device comprises substantially simultaneously accessing the user interface of the first electronic device and the user interface of the second electronic device.

In one aspect, the method may further comprise preventing contact between the first electronic device and the second electronic device. For example, when the foldable structure further comprises a third panel, preventing contact between the first electronic device and the second electronic device comprises may be practiced by positioning the third panel between the first electronic device and the second electronic device.

A still further embodiment of the invention is a portable electronic device holder kit comprising or including: a foldable structure comprising a first panel and a second panel, wherein at least one of the first panel and the second panel is rotatable between a closed position and one or more open positions, and wherein, in the closed position, an interior side of the first panel faces an interior side of the second panel; at least two electronic device retaining devices; and means for mounting the at least two electronic devices to the foldable structure. The mobile electronic devices may be one or more of a mobile phone, a personal digital assistant, a video player, a music player, an electronic book, an electronic tablet, or a computer.

In one aspect, the means for mounting the at least two electronic devices to the foldable structure may be an adhesive, thread, or a hook and loop fasteners.

In another aspect, the kit may further comprise at least one third panel mountable to the foldable structure.

In another aspect, the kit may also include at least one instruction manual or instruction digital disc.

These and other aspects, features, and advantages of this invention will become apparent from the following detailed description of the various aspects of the invention taken in conjunction with the accompanying drawings

BRIEF DESCRIPTION OF THE DRAWINGS

The subject matter, which is regarded as the invention, is particularly pointed out and distinctly claimed in the claims at the conclusion of the specification. The foregoing and other aspects, features, and advantages of the invention will be readily understood from the following detailed description of aspects of the invention taken in conjunction with the accompanying drawings in which:

FIG. 1 is a perspective view of a mobile phone holder in an open position according to an aspect of the present invention.

FIG. 2 is a perspective view of the mobile phone holder shown in FIG. 1 in a closed position according to an aspect of the present invention.

FIG. 3 is an exploded perspective view similar to FIG. 1 showing an assembly of the mobile phone holder shown in FIGS. 1 and 2 and two mobile phones in phantom.

FIG. 4 is a perspective view of an assembly of the holder shown in FIGS. 1-3 in an open position holding two mobile phones.

FIG. 5 is a plan view of the holder shown in FIGS. 1-3.

FIG. 6 is a bottom elevation view of the holder shown in FIG. 5, the top elevation view being a mirror image thereof.

FIG. 7 is a right-side elevation view of the holder shown in FIG. 5, the left-side elevation view being a mirror image thereof.

FIG. 8 is detailed view of a portion of the holder shown in FIG. 6 identified by Detail 8 in FIG. 6.

FIGS. 9, 9A, and 9B are alternative detailed cross-sectional views of the detailed view shown in FIG. 8 according to aspects of the invention.

FIG. 12 is a perspective view of another mobile phone holder in an opened position according to an aspect of the present invention.

FIG. 13 is bottom elevation view of another holder in the closed position according to an aspect of the invention.

FIG. 21 is a perspective view of another mobile phone holder in an opened position according to an aspect of the present invention.

FIG. 22 is a perspective view of the mobile phone holder shown in FIG. 21 in the closed position.

FIG. 23 is a bottom view of the mobile phone holder shown in FIG. 21 in the closed position.

DETAILED DESCRIPTION OF THE INVENTION

Figure 11:
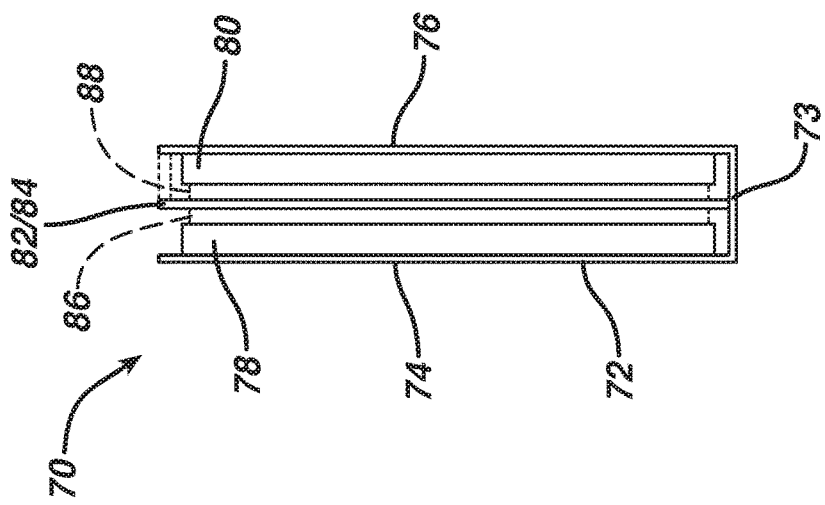
FIG. 11 is bottom elevation view of the holder shown in FIG. 10 in the closed position.

FIG. 1 is a perspective view of a mobile phone holder or case 10 in an open position according to an aspect of the present invention. FIG. 2 is a perspective view of the mobile phone holder or case 10 shown in FIG. 1 in a closed position according to an aspect of the present invention. As shown in FIGS. 1 and 2, one aspect of the invention includes a foldable structure 12 comprising a first panel 14 and a second panel 16, wherein at least one of the first panel 14 and the second panel 16 is rotatable, as indicated by arrows 17, between a closed position, for example, as shown in FIG. 2, and one or more open positions, for example, as shown in FIG. 1. The panels 14 and 16 are typically two-sided panels, having an internal side 18 and 20, respectively, and an external side 22 and 24, respectively. According to an aspect of the invention, when foldable structure 12 is in the closed position, the interior side 18 of the first panel 14 faces the interior side 20 of the second panel 16.

As also shown in FIGS. 1 and 2, mobile phone holder 10 includes a first mobile phone retaining device (or sub-case) 26 mounted on the interior side 18 of the first panel 14, and a second mobile phone retaining device (or sub-case) 28 mounted on the interior side 20 of the second panel 16. According to aspects of the invention, phone retaining devices 26 and 28 may assume a broad range of shapes and structures while providing the desired function of retaining a phone, or other device, to the respective panels 14 and 16 of holder 10. The shape and structure of the retaining devices 26 and 28 shown in FIGS. 1 and 2 are meant to be representative of one of many shapes and structures that may be used for aspects of the invention. For example, other retaining devices having different shapes and structures are illustrated and disclosed with respect to FIGS. 24-26 below.

In the following discussion, aspects of the invention are disclosed and described with reference to the holder 10 as comprising a "mobile phone holder." However, it is envisioned that aspects of the present invention may be used to hold or retain a broad range of devices, both electronic and non-electronic. For example, according to aspects of the invention, it is envisioned that holder 10 may be adapted or configured to hold or retain a mobile phone, such as, a smart phone, for instance and Apple® IPhone® mobile phone or a Samsung® Galaxy® mobile phone, among others; a personal digital assistant; a video player; a music player; an electronic book reader, such as, a Amazon® Kindle® or a Barnes & Noble® Nook®, among others; an electronic tablet, such as, an Ipad®, or a computer, such as, a hand-held computer. However, though aspects of the invention may be adapted or configured for these and other electronic and/or non-electronic devices, in the following disclosure the non-limiting expressions "mobile phone" and "mobile phone retaining device" will be used to facilitate disclosure of the invention in its many aspects. The use of these expressions is not meant to in any way limit the type of electronic or non-electronic devices that may be encompassed by aspects of the inventions disclosed herein, for example, as defined in the appending claims.

Returning to our discussion of FIGS. 1 and 2, according to an aspect of the invention, when the first panel 14 and the second panel 16 of structure 12 are positioned in the closed position, for example, as shown in FIG. 2, the first mobile phone retaining device 26 is typically adjacent the second mobile phone retaining device 28. According to an aspect of the invention, when the first panel 14 and the second panel 16 of structure 12 are positioned in an open position, for example, as shown in FIG. 1, the first mobile phone retaining device 26 and the second mobile phone retaining device 28 are exposed and, for example, accessible to a user. Though an aspect of the invention shown in FIG. 1 is shown in one opened position, for example, where panels 14 and 16 are positioned to define an angle α of 180 degrees between the plane of panel 14 and the plane of panel 16, it is envisioned that, according to aspects of the invention, structure 12, first panel 14, and second panel 16 may assume a broad range of open positions. For example, in one aspect, an open position may comprise any position of panels 14 and 16 that are not in the closed position shown in FIG. 2. In another aspect of the invention, an open position may be any position where at least one of, but preferably both, panels 14 and 16 are exposed, for example, accessible by a user. For example, in one aspect an open position may comprise any position between the open position shown in FIG. 1, and a position where the planes of panels 14 and/or 16 define an angle α of at least 15 degrees, for example, an angle α ranging from 15 degrees to substantially 360 degrees. For instance, in one aspect, an open position for panels 14 and 16 may define an angle α greater than 180 degrees and less than about 360 degrees, for example, where panel 14 is rotated beyond the 180-degree rotation relative to panel 16 shown in FIG. 1. In one aspect, an open position may define an angle α of about 360 degrees, where external surface 24 of panel 14 may contact external surface 24 of panel 16.

As also shown in FIGS. 1 and 2, panels 14 and 16 may be fabricated from a one or more common panels and rotate about a common "spine" 30, for example, a spine 30 defined by one or more creases, seams, folds, or crimpings, and the like, 32 and 34 (shown as dashed lines in FIG. 1, but solid lines in FIG. 2). Though spine 30 shown in FIGS. 1 and 2 is depicted as a generally flat spine, according to aspects of the invention, spine 30 may be curved, angled, or pointed. For example, in one aspect, spine 30 may comprise the juncture, for example, a substantially linear juncture, between panel 14 and panel 16, for example, a fold, a seam, or a crease between panel 14 and panel 16. In another aspect, panels 14 and 16 may be formed from individual separate panels, and then mounted for rotation about spine 30, for example, bonded, for example, with an adhesive or stitches, or with fasteners, such as, threaded fasteners, staples, rings, grommets, studs, and/or clasps, among other fasteners.

FIG. 3 is an exploded perspective view similar to FIG. 2 showing an assembly 30 of the mobile phone holder 10 shown in FIGS. 1 and 2 and two mobile phones 36 and 38, shown in phantom. FIG. 4 is a perspective view of the assembly 30 of the holder 10 and mobile phones 36 and 38 shown in FIG. 3 in an open position.

FIGS. 3 and 4 schematically illustrate one advantageous feature of the invention. As shown in FIG. 4, mobile phones 36 and 38 typically include a user interface 37 and 39, respectively. User interfaces 37 and 39 may comprise a display or keypad, for example, a keypad having discrete electrical-mechanical buttons or a display having touch-sensitive icons that are activated by the user with a user's fingers or a stylus. According to one aspect of the invention, holder or case 10 (and any holder or case disclosed herein) allows a user to access both user interfaces 37 and 39, and thus, provide user input to or viewing of both interfaces 37 and 39, at substantially the same time, for example, simultaneously. That is, in contrast to prior art holders or cases for mobile phones (or other electronic or non-electronic devices), aspects of the present invention allow both mobile phones 36 and 38 to be accessed and used at substantially the same time while holder 10 retains the phones 36 and 38. For example, both interfaces 37 and 38 may be viewed and/or manipulated. Typical, prior art cases do not permit this advantageous access and use of both mobile phones 36 and 38, but typically expose only one mobile phone for use while concealing another mobile phone. Accordingly, in contrast to the aspects of the present invention, prior art mobile phone holders do not allow for the direct, substantially simultaneous access to the user interface (for example, display and/or keypad) of two or more mobile phones. Though only two mobile phones 36 and 38 are shown in FIGS. 3 and 4, it is envisioned that aspects of the present invention may permit access and use of three or more mobile phones, for example, three or more mobile phones mounted in holders having three or more panels similar to panels 14 and 16.

FIG. 5 is a plan view of the holder 10 shown in FIGS. 1-4 in an opened position. FIG. 6 is a bottom elevation view of the holder 10 shown in FIG. 5, the top elevation view being a mirror image thereof. FIG. 7 is a right-side elevation view of the holder 10 shown in FIG. 5, the left-side elevation view being a mirror image thereof. As shown in FIGS. 5-7, foldable structure 12 may comprise a substantially planar sheet (or backing) 40 of material and panels 14 and 16 may comprise portions of the planar sheet (or backing) 40, for example, as delimited by one or more folds, creases, or seams 32 and 34. As shown, sheet 40 may typically be rectangular in shape, for example, to accommodate the shape of mobile phone retainers 26 and 28 (and of mobile phones 36 and 38, not shown in FIGS. 5-7), but in other aspects of the invention it is envisioned that sheet 40 may be square, circular, or oval, among other shapes.

Sheet 40, and thus, panels 14 and 16, may be provided in a broad range for materials, for example, a plastic, a metal, a fabric, a wood, or a paperboard, among other materials, and combinations thereof. For example, in one aspect, sheet 40 may be made from one or more of the following plastics: a polyamide (PA), for example, nylon; a polyethylene (PE), both high-density polyethylene (HDPE) and low-density polyethylene (LDPE); a polyethylene terephthalate (PET); a polypropylene (PP); a polyester (PE); a polytetrafluoroethylene (PTFE); a polystyrene (PS); an acrylonitrile butadiene styrene (ABS); a polycarbonate (PC); or a polyvinylchloride (PVC or a "vinyl"); among other plastics. In another aspect, sheet 40 may be made from one or more metals, for example, steel sheet, stainless steel sheet, aluminum sheet, titanium sheet, brass sheet, bronze sheet, copper sheet, or even silver or gold sheet, or any other structural or ornamental metal.

However, in one aspect, sheet 40 may preferably be made from a fabric with or without a reinforcing core material. For example, in one aspect, sheet 40 may be made from a woven or non-woven fabric, for instance, a woven or non-woven fabric made from a natural fiber and/or a synthetic fiber. The non-woven fabric may be a felted fabric. The natural fiber may be cotton, wool (for example, felted wool), silk, or rayon. The synthetic fiber may be made from one or more of the plastics listed above, for example nylon fiber, rayon fiber, or polyester fiber. In another aspect, sheet 40 may also comprise a leather or a "pleather," with or without a reinforcing core material.

FIG. 8 is detailed view of a portion of the holder 10 shown in FIG. 6 identified by Detail 8 in FIG. 6. FIGS. 9, 9A, and 9B are alternative detailed cross-sectional views of the detailed view shown in FIG. 8 according to aspects of the invention. FIG. 9 is detailed cross-sectional view of one alternative construction of sheet 40. As shown in FIGS. 8 and 9, sheet 40 may comprise a core material (or core panel or webbing) 42, for example, a reinforcing core material or panel, and an overlaid material (or cover or sheathing) 44. Core material 42, for example, a rigid or semi-rigid material, may comprise any one or more of the materials referenced above, for example, a plastic, a metal, a fabric, a wood, or a paperboard, among other materials. The overlaid material 44 may also comprise any one or more of the materials referenced above, for example, a plastic, a metal, a fabric, a wood, or a paperboard, among other materials. However, in one aspect, sheet 40 may comprise a core material 42 of a paperboard and an overlaid material comprising a woven or non-woven fabric, for example, a woven cotton fabric, a woven synthetic fiber fabric, or a non-woven felted fabric. In one aspect, overlaid material (or cover or sheathing) 44 may be decorative, that is, having one or more decorative designs or patterns. It is also envisioned that sheet 40 may comprise a sufficiently rigid material, for example, made of one or more of the plastics referenced above, where core material 42 may be omitted. In addition, sheet 40—with or without a core material 42—may also be decorative, that is, having one or more decorative designs or patterns. Overlaid material 44 may be attached to core material 42 by conventional means, for example, an adhesive, stitching, stapling, or mechanical fasteners.

As shown in FIGS. 8 and 9, overlaid material 44 may extend at least partially beneath phone retaining device 28 (and/or 26), for example, where phone retaining device 28 (and/or 26) covers exposed edges 41 of overlaid material 44. In other aspects, overlaid material 44 may substantially completely cover core material 42 where no core material 42 may be exposed.

FIG. 9A is detailed cross-sectional view of another alternative construction of sheet 40. In this aspect, sheet 40 may comprise one or more core materials (or core panels or webbings) 42, for example, a reinforcing core material or panel, and two or more overlaid materials (or covers or sheathings) 44 and 45. Again, one or more core materials 42, for example, a rigid or semi-rigid material, may comprise any one or more of the materials referenced above, for example, a plastic, a metal, a fabric, a wood, or a paperboard, among other materials. The overlaid materials 44 and 45 may also comprise any one or more of the materials referenced above, for example, a plastic, a metal, a fabric, a wood, or a paperboard, among other materials. However, in one aspect, sheet 40 may comprise a core material 42 of a paperboard and overlaid materials 44 and 45 comprising a woven or unwoven fabric, for example, a woven cotton fabric, a woven synthetic fiber fabric, or an unwoven felt fabric. In one aspect, overlaid materials (or cover or sheathing) 44 and 45 may be decorative, that is, having one or more decorative designs or patterns. Overlaid materials 44 and 45 may be attached to one or more core materials 42 by conventional means, for example, with an adhesive, stitching, or stapling. One example of attaching overlaid material 44 to overlaid material 45 is stitching 47 shown in FIG. 9A.

In the aspect shown in FIG. 9A, overlaid materials 44 and 45 may extend at least partially beneath phone retaining device 28 (and/or 26). However, as shown in FIG. 9A, in another aspect, overlaid materials 44 and 45 may substantially completely cover core material 42 where no core material 42 may be exposed.

FIG. 9B is detailed cross-sectional view of another alternative construction of sheet 40. In this aspect, sheet 40 may comprise one or more core materials (or core panels or webbings) 42 and 43, for example, a reinforcing core materials or panels, and two or more overlaid materials (or covers or sheathings) 44 and 45. Again, two or more core materials 42 and 43, for example, a rigid or semi-rigid material, may comprise any one or more of the materials referenced above, for example, a plastic, a metal, a fabric, a wood, or a paperboard, among other materials. The overlaid materials 44 and 45 may also comprise any one or more of the materials referenced above, for example, a plastic, a metal, a fabric, a wood, or a paperboard, among other materials. However, in one aspect, sheet 40 may comprise two core materials 42 and 43 of a paperboard and overlaid materials 44 and 45 comprising a woven or an unwoven fabric, for example, a woven cotton fabric, a woven synthetic fiber fabric, or a non-woven felt fabric. In one aspect, overlaid materials (or cover or sheathing) 44 and 45 may be decorative, that is, having one or more decorative designs or patterns, for instance, different decorative patterns. Overlaid materials 44 and 45 may be attached to one or more core materials 42 and 43 by conventional means, for example, an adhesive, stitching, or stapling. One example of attaching overlaid material 44 to overlaid material 45 is stitching 47 shown in FIG. 9B.

In the aspect shown in FIG. 9B, overlaid materials 44 and 45 may extend at least partially beneath phone retaining device 28 (and/or 26). However, as shown in FIG. 9B, in another aspect, overlaid materials 44 and 45 may substantially completely cover core material 42 where no core material 42 may be exposed.

In one aspect, as illustrated in FIG. 9B, sheet 40 may be constructed by mounting core material 42 to overlaid material 45, for example, with an adhesive, stitching, and/or staples; mounting core material 43 to overlaid material 44, for example, with an adhesive, stitching, and/or staples; and attaching the core material 42/overlaid material 45 assembly to the core material 43/overlaid material 44 assembly, for example, with an adhesive, stitching, and/or staples, to provide sheet 40. One example of attaching the core material 42/overlaid material 45 assembly to the core material 43/overlaid material 44 assembly is stitching 47 shown in FIG. 9B.

In one aspect of the invention, sheet 40, for example, one or more panels 14 and 16, may include apertures, holes, or perforations 45. Apertures or perforations 45 may be provided and positioned to accommodate inputs and/or outputs ports from the device, for example, mobile phone, mounted in holder 10. For example, apertures or perforations 45 in may be provided and positioned to allow access to a camera lens, a microphone, and/or a speaker, among other devices that may be provided with a mobile phone.

As shown in FIGS. 5-7, sheet 40 of structure 12 may have a length 46 ranging from about 3 inches to about 36 inches, for example, depending upon the size of the devices being retained, but sheet 40 may typically have a length 46 ranging from 7 inches to about 14 inches, for instance, about 8 inches for two panels and about 12 inches for three panels. Sheet 40 of structure 12 may have a width 48 ranging from about 3 inches to about 36 inches, for example, depending upon the size of the devices being retained, but sheet 40 may typically have a width 48 ranging from about 5 inches to about 8 inches, for instance, about 7 inches.

As shown in FIGS. 8 and 9, sheet 40 of foldable structure 12 may have a thickness 50 ranging from about 0.001 inches to about ¼ (0.25) inch, for example, sheet 40 may typically have a thickness 50 ranging from about ¹⁄₃₂ (0.03125) inches to about ⅛ (0.125) inch, for instance, about ¹⁄₁₆ (0.0625) inches. Sheet 40 of foldable structure 12 may have a core 42 having a thickness 52 ranging from about 0.001 inches to about ¼ (0.25) inches, for example, core 42 may typically have a thickness 52 ranging from about ¹⁄₃₂ (0.03125) inches to about ⅛ (0.125) inches, for instance, about ¹⁄₁₆ (0.0625) inches.

As noted previously, according to aspects of the invention, mobile phone retainers 26 and 28 may comprise any retaining device adapted or configured to retain a mobile phone while being capable of being mounted to panels 14 and 16. For example, as is known in the art, retainers 26 and 28 may include a back plate 54 and at least two sides 56 and 58 projecting from back plate 54. Sides 56 and 58 may be sized and shaped to engage and retain a mobile phone (not shown). For example, though shown generally straight in FIGS. 5-7, sides 56 and 58 may comprise shaped (for example, curved) surfaces adapted to conform to (for example, snuggly conform to) the opposing curved sides of a mobile phone to engage and retain the mobile phone. Other mobile phone retaining devices are shown and described with respect to FIGS. 24-26.

Mobile phone retainers 26 and 28 may be mounted to panels 14 and 16, respectively, by any convenient means, for example, with an adhesive or with mechanical fasteners. In one aspect, retainers 26 and 28 may be mounted to panels 14 and 16, respectively, with an adhesive between back plates 54 and panels 14 and 16. For example, an adhesive that may be used includes an epoxy, an RTV silicone, or a glue, for instance, a glue provided by Beacon Adhesives and marketed under the name "3-in-1 Craft Glue," or its equivalent. In another aspect, retainers 26 and 28 may be removably mounted to panels 14 and 26, respectively, for example, with the use of detachable fasteners, for example, threaded fasteners and/or hook and loop type fasteners, such as, Velcro® hook and loop type fasteners, or their equivalents.

According to aspects of the invention, mobile phone retainers 26 and 28 may be provided with apertures, holes, or perforations positioned and sized to accommodate input ports and/or output ports from in the mobile phones mounted retainers 26 and 28. For example, holes, apertures, or perforations 60 (shown in dashed line) may be provided and positioned in back plates 54 to allow access to a camera lens, a microphone, and/or a speaker, among other devices that may be provided with a mobile phone. Holes, apertures, or perforations 60 in back plates 54 may typically be substantially aligned with holes, apertures, or perforations 45 in panels 14 and 16 to provide unobstructed access to the ports and devices in mobile phones mounted in holder 10.

Also, according to aspects of the invention, mobile phone retainers 26 and 28 may be provided with apertures, holes, or perforations positioned in sides 56 and 58 to accommodate input ports and/or output ports in the mobile phone mounted in retainers 26 and 28. For example, as shown in FIG. 6, holes, apertures, or perforations 62 (shown in dashed line) may be provided and positioned in sides 56 and/or 58 to allow access to input ports, and/or output ports and/or power ports, microphones, and/or speakers, among other ports and devices that may be provided with a mobile phone.

Mobile phone retainers 26 and 28 may be made from any one or more of the materials referenced above, for example, a plastic, a metal, a fabric, a wood, or a paperboard, among other materials. In one aspect, mobile phone retainers 26 and 28 are made of a plastic, for example, one or more of the plastics disclosed above. In one preferred aspect, mobile phone retainers 26 and 28 may be made of a polycarbonate plastic or a thermoplastic polyurethane (TPU), or their equivalent.

As shown in FIGS. 5-7, mobile phone retainers 26 and 28 may have a length 64 ranging from about 3 inches to about 36 inches, for example, depending upon the size of the devices being retained, but mobile phone retainers 26 and 28 may typically have a length 64 ranging from about 3 inches to about 7 inches, for instance, about 6 inches. Mobile phone retainers 26 and 28 may have a width 66 ranging from about 3 inches to about 36 inches, for example, depending upon the size of the devices being retained, but mobile phone retainers 26 and 28 may typically have a width 66 ranging from about 2 inches to about 4 inches, for instance, about 3 inches. As shown in FIG. 7, sides 56 and 58 of mobile phone retainers 26 and 28 may have a height 68 ranging from about ¼ (0.25) inches to about ⅝ (0.625) inches, for example, depending upon the size of the devices being retained, but sides 56 and 58 may typically have a height 68 ranging from about ¼ (0.25) inches to about ⅝ (0.625) inches, for instance, about 7/16 (0.5625) inches. The thickness of back plates 54, and sides 56 and 58 of mobile phone retainers 26 and 28 may range from about 1/64 (0.01563) inches to about 1/16 (0.0625) inches, but are typically about 1/32 (0.03125) inches in thickness.

Figure 10:
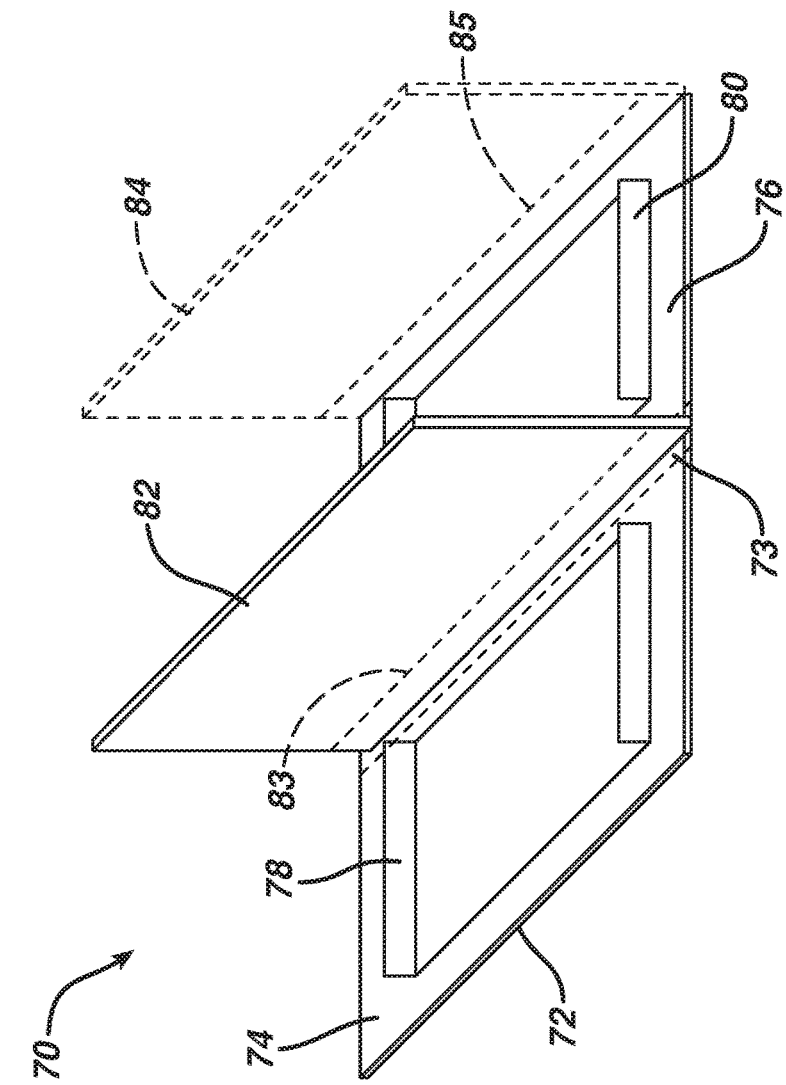
FIG. 10 is a perspective view of another mobile phone holder in an opened position according to an aspect of the present invention.

FIG. 10 is a perspective view of another mobile phone holder 70 in an opened position according to an aspect of the present invention. Similar to other aspects of the invention, holder 70 includes a foldable structure 72 comprising a first panel 74 and a second panel 76, a first mobile phone retaining device 78 mounted on the interior side of the first panel 74, and a second mobile phone retaining device 80 mounted on the interior side of the second panel 76. FIG. 11 is bottom elevation view of the holder 70 shown in FIG. 10 in the closed position. Foldable structure 72 may have all the features and attributes of foldable structure 12 disclosed above, and mobile phone retaining devices 78 and 80 may have all the features and attributes of mobile phone retaining devices 26 and 28 disclosed above.

According to the aspect of the invention shown in FIGS. 10 and 11, foldable structure 72 of holder 70 includes one or more third panels 82 mounted to foldable structure 72, for example, to first panel 74 and/or to second panel 76. (In one aspect, third panel 82 may not be mounted to foldable structure 72 while still providing the desired function disclosed herein.) Third panel 82 may have all the features and attributes of first panel 14 and second panel 16 disclosed above. In one aspect, third panel 82 is sized and positioned to minimize or prevent contact between mobile phones (not shown in FIG. 10) mounted in holder 70 when, for example, holder 70 is in the closed position shown in FIG. 11. Representative mobile phones 86 and 88 are shown in dashed line in FIG. 11. As shown in FIG. 11, when panels 74 and 76 having retaining devices 78 and 80, respectively, are folded into the closed position shown in FIG. 11, third panel 82 provides a barrier minimizing or preventing contact between mobile phones, thus minimizing or preventing damage to mobile phones 86 and 88 due to contact that may occur without the presence of third panel 82.

As shown in FIG. 10, in one aspect, third panel 82 may be attached to a spine 73 between panels 74 and 76, for example, mounted along the spine 73 of foldable structure 72. As also shown in FIG. 10, in another aspect, third panel 82 may be mounted along an edge or periphery of foldable structure 72, for instance, as shown by third panel 84 in dashed line in FIG. 10 mounted along a lateral edge of foldable structure 72. In one aspect, third panel 82 or 84 may be also be mounted along an upper or lower edge of foldable structure 72, instead of or in addition to the side or lateral edge mounting shown in FIG. 10. Third panel 84 may have all the features and attributes of first panel 14 and second panel 16 disclosed above.

As also shown in FIG. 10, third panel 82 and/or third panel 84 may include one or more creases, seams, folds, or crimpings 83 and 85, respectively, about which third panel 82 and/or 84 may bend or rotate. Third panels 82 and 84 may be mounted to foldable structure 72 by conventional means, for example, with an adhesive, mechanical fasteners, hook and loop fasteners, and/or with stitching.

FIG. 12 is a perspective view of another mobile phone holder 90 in an opened position according to an aspect of the present invention. Similar to other aspects of the invention, holder 90 includes a foldable structure 92 comprising a first panel 94 and a second panel 96, a first mobile phone retaining device 98 mounted on the interior side of the first panel 94, and a second mobile phone retaining device 100 mounted on the interior side of the second panel 96. Foldable structure 92 may have all the features and attributes of foldable structure 12 disclosed above, and mobile phone retaining devices 98 and 100 may have all the features and attributes of mobile phone retaining devices 26 and 28 disclosed above.

Panels FIG. 12 also includes a third panel 102 similar to third panels 82 and 84 shown in FIGS. 10 and 11. However, in this aspect, third panel 102 includes one or more openings or recesses 104 adapted to receive currency, credit/debit cards, or other cards or documents, such as, a drivers license. Third panel 102 may have all the features and attributes of first panel 14 and second panel 16 disclosed above. In addition, third panel 104 may typically provide the protective function of third panel 82/84 shown in FIGS. 10 and 11. Though only one side of third panel 102 is shown having recesses 104 in FIG. 12, both sides of third panel 102 may include one or more recesses 104.

As also shown in FIG. 12, in another aspect, third panel 102 may be mounted along an edge or periphery of foldable structure 92, for instance, as shown by third panel 103 in dashed line in FIG. 12 mounted along a lateral edge of foldable structure 92. According to this aspect, third panel 103 may have one or more openings or recesses 105 adapted to receive currency, credit/debit cards, or other cards or documents, such as, a drivers license. In one aspect, third panel 102 or 103 may be also be mounted along an upper or lower edge of foldable structure 92, instead of or in addition to the side or lateral edge mounting shown in FIG. 12. Third panel 103 may have all the features and attributes of first panel 14 and second panel 16 disclosed above.

FIG. 13 is bottom elevation view of another holder 110 in a closed position according to an aspect of the present invention. Similar to other aspects of the invention, holder 110 includes a foldable structure 112 comprising a first panel 114 and a second panel 116, a first mobile phone retaining device 118 mounted on the interior side of the first panel 114, and a second mobile phone retaining device 120 mounted on the interior side of the second panel 116. FIG. 13 also includes a third panel 122 similar to third panels 82 and 84 shown in FIGS. 10 and 11 and/or third panel 102 shown in FIG. 12. In addition, third panel 122 may typically provide the protective function of third panel 82/84 shown in FIGS. 10 and 11 and third panel 102 shown in FIG. 12. Foldable structure 112 may have all the features and attributes of foldable structure 12 disclosed above, and mobile phone retaining devices 118 and 120 may have all the features and attributes of mobile phone retaining devices 26 and 28 disclosed above.

According to the aspect shown in FIG. 13, holder 110 may also include a compartment or case 124, for example, a collapsible compartment or case, that may provide a compartment for currency, credit/debit cards, coins, or other items. In one aspect, compartment 124 may comprise a wallet or purse. As shown in FIG. 13, compartment 124 may comprise a panel 126, for example, similar to panels 114, 116, or 122, which is mounted to foldable structure 112, and at least two opposing collapsible sides 128 (only one side is shown in FIG. 13) mounted, for example, to foldable structure 112 and panel 126. According to this aspect, collapsible compartment 124 may be opened and closed as needed, and may retained in the closed position (the open position of compartment 124 is shown in FIG. 13) by one or more fasteners 130, for example, snaps, clasps, one or more straps, or magnetic fasteners.

Figure 14:
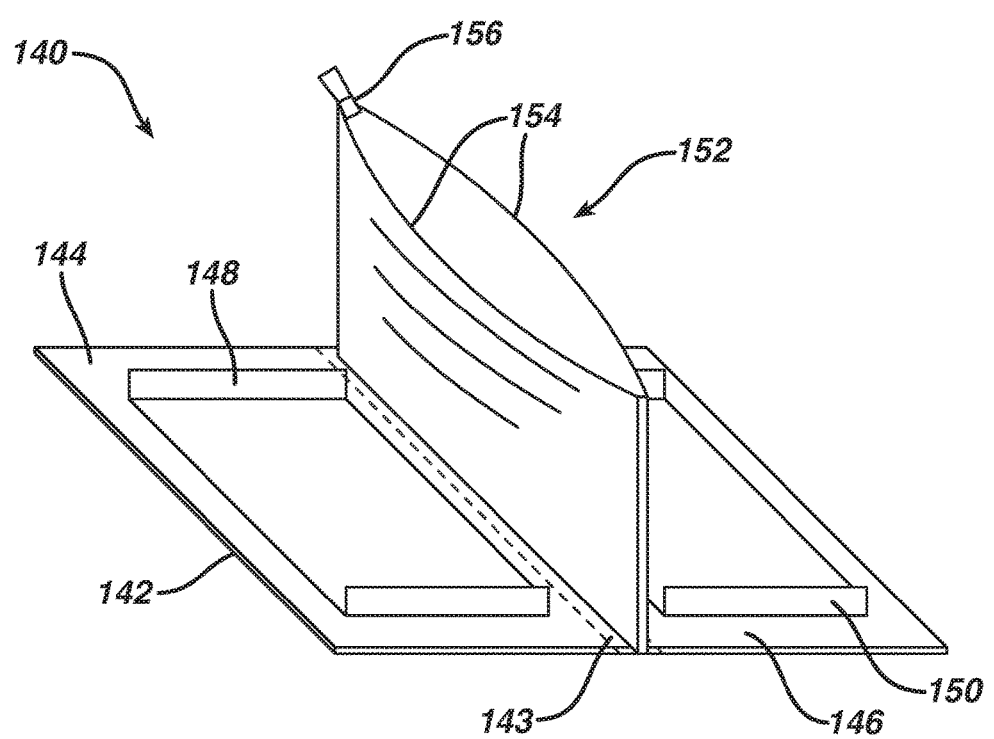
FIG. 14 is a perspective view of another mobile phone holder in an opened position according to an aspect of the present invention.

FIG. 14 is a perspective view of another mobile phone holder 140 in an opened position according to an aspect of the present invention. Similar to other aspects of the invention, holder 140 includes a foldable structure 142 comprising a first panel 144 and a second panel 146, a first mobile phone retaining device 148 mounted on the interior side of the first panel 144, and a second mobile phone retaining device 150 mounted on the interior side of the second panel 146. Foldable structure 142 may have all the features and attributes of foldable structure 12 disclosed above, and mobile phone retaining devices 148 and 150 may have all the features and attributes of mobile phone retaining devices 26 and 28 disclosed above.

According to the aspect shown in FIG. 14, holder 140 may also include a compartment or case 152, for example, a collapsible compartment or case, that may provide a compartment for currency, credit/debit cards, coins, or other items. In one aspect, compartment 152 may comprise a wallet or purse. As shown in FIG. 14, compartment 152 may be mounted to foldable structure 112, for example, on a spine 143 between panels 144 and 146 as shown, or to a periphery of panel 144 and/or 146. Compartment 152 may include a least two opposing sides 154. Sides 154 may have all the features and attributes of first panel 14 and second panel 16 disclosed above. Compartment 152 may also typically provide the protective function of third panel 82/84 shown in FIGS. 10 and 11 and third panel 102 shown in FIG. 12.

According to this aspect, collapsible compartment 152 may be opened and closed as needed, and may be retained in the closed position (the open position of compartment 124 is shown in FIG. 14) by one or more fasteners 156, for example, a zipper, snaps, clasps, or magnetic fasteners.

Figure 15:
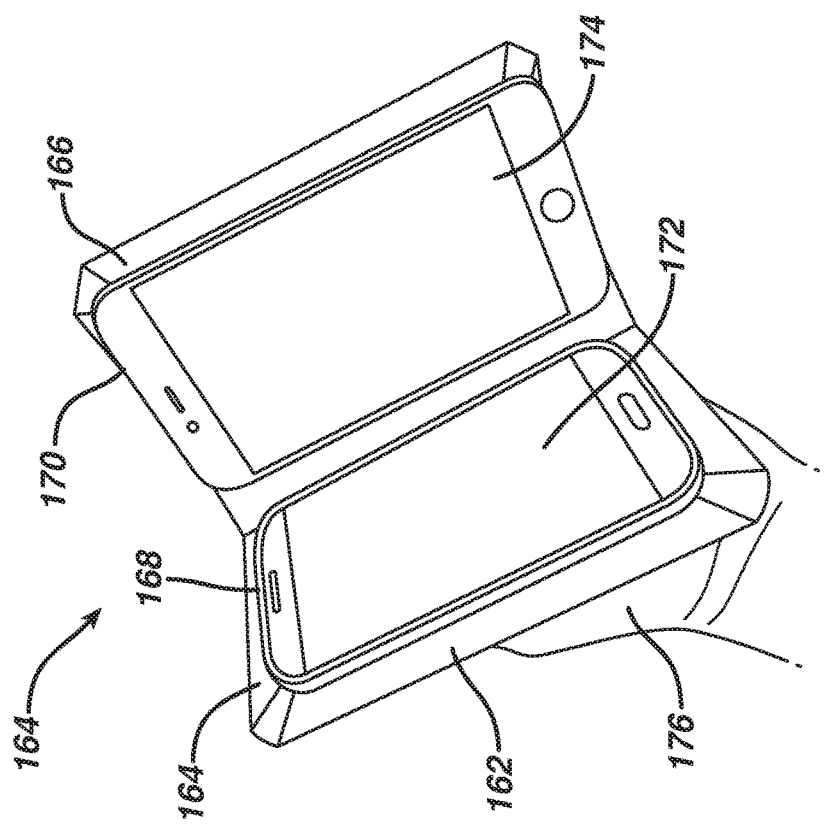
FIG. 15 is a perspective photograph of another mobile phone holder in an opened position according to an aspect of the present invention.

FIG. 15 is a perspective photograph of another mobile phone holder 160 in an opened position according to an aspect of the present invention. Similar to other aspects of the invention, holder 160 includes a foldable structure 162 comprising a first panel 164 and a second panel 166, a first mobile phone retaining device 168 mounted on the interior side of the first panel 164, and a second mobile phone retaining device 170 mounted on the interior side of the second panel 166. FIG. 13 also includes two typical mobile phones 172 and 174 mounted in mobile phone retaining devices 168 and 170, respectively. A typical hand 176 of a user holding holder 160 is also shown in FIG. 15. Holder 160 is similar in appearance and function to holder 10 shown in FIGS. 1-9. For example, foldable structure 162 may have all the features and attributes of foldable structure 12 disclosed above, and mobile phone retaining devices 168 and 170 may have all the features and attributes of mobile phone retaining devices 26 and 28 disclosed above.

Figure 16:
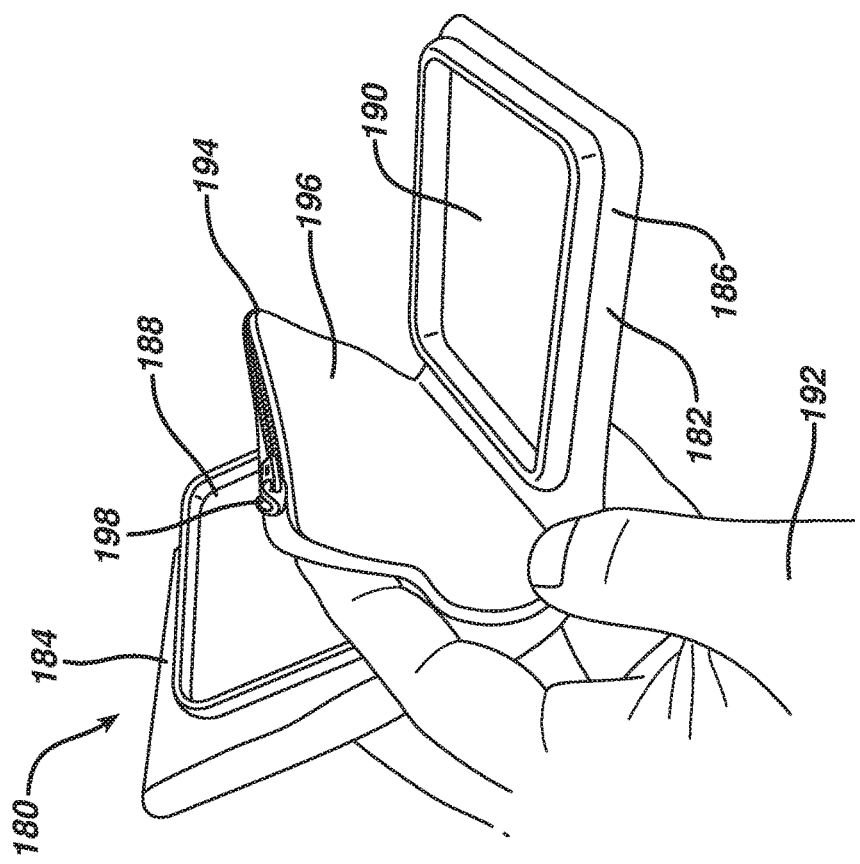
FIG. 16 is a perspective photograph of another mobile phone holder in an opened position according to an aspect of the present invention.

FIG. 16 is a perspective photograph of another mobile phone holder 180 in an opened position according to an aspect of the present invention. Similar to other aspects of the invention, holder 180 includes a foldable structure 182 comprising a first panel 184 and a second panel 186, a first mobile phone retaining device 188 mounted on the interior side of the first panel 184, and a second mobile phone retaining device 190 mounted on the interior side of the second panel 186. A typical hand 192 of a user of holding holder 180 is also shown in FIG. 16.

As shown in FIG. 16, holder 180 includes a compartment or case 194, for example, a collapsible compartment or case, that may provide a compartment for currency, credit/debit cards, coins, or other items. In one aspect, compartment 194 may comprise a wallet or purse. Accordingly, holder 180 shown in FIG. 16 may be similar in appearance and function, and have all the attributes of, holder 140 shown in FIG. 14.

As shown in FIG. 16, compartment 194 may be mounted to foldable structure 182, for example, between panels 184 and 186 as shown, or to a periphery of panel 184 and/or 186. Compartment 194 may include a least two opposing sides 196. Sides 196 may have all the features and attributes of first panel 14 and second panel 16 disclosed above. Compartment 194 may also typically provide the protective function of third panel 82/84 shown in FIGS. 10 and 111 and third panel 102 shown in FIG. 12.

According to this aspect, compartment 194 may be opened and closed as needed, and may be retained in the closed position (the closed position of compartment 194 is shown in FIG. 16) by one or more fasteners 198, for example, a zipper, snaps, clasps, or magnetic fasteners.

Figure 17:
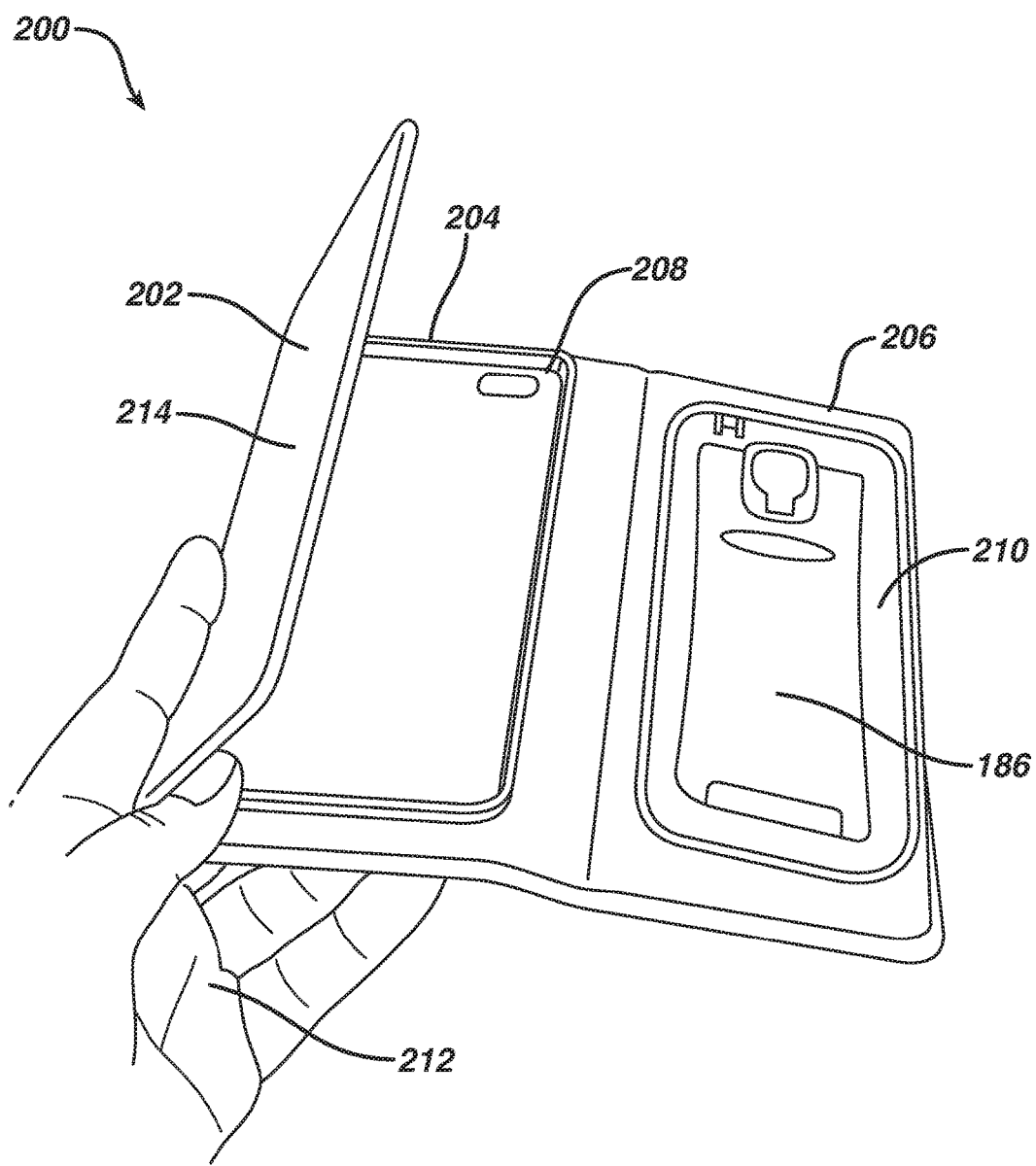
FIG. 17 is a perspective photograph of another mobile phone holder in an opened position according to an aspect of the present invention.

FIG. 17 is a perspective photograph of another mobile phone holder 200 in an opened position according to an aspect of the present invention. Similar to other aspects of the invention, holder 200 includes a foldable structure 202 comprising a first panel 204 and a second panel 206, a first mobile phone retaining device 208 mounted on the interior side of the first panel 204, and a second mobile phone retaining device 210 mounted on the interior side of the second panel 206. A typical hand 212 of a user of holding holder 200 is also shown in FIG. 17. Foldable structure 202 may have all the features and attributes of foldable structure 12 disclosed above, and mobile phone retaining devices 208 and 210 may have all the features and attributes of mobile phone retaining devices 26 and 28 disclosed above.

As shown in FIG. 17, holder 200 includes one or more third panels 214 mounted to foldable structure 202, for example, mounted to a periphery of first panel 204. Holder 200 shown in FIG. 17 may be similar in appearance and function, and have all the attributes of holder 70 shown in FIGS. 10 and 11. Third panel 214 may have all the features and attributes of first panel 14 and second panel 16 disclosed above. In one aspect, third panel 214 is sized and positioned to minimize or prevent contact between mobile phones (not shown in FIG. 17) mounted in holder 200 when holder 200 is in the closed position, for example, as shown above in FIG. 11. Specifically, when panels 204 and 206 having retaining devices 208 and 210, respectively, are folded into the closed position shown in FIG. 11, third panel 214 provides a barrier minimizing or preventing contact between mobile phones, thus minimizing or preventing damage to the mobile phones due to contact that may occur without the presence of third panel 214.

Figure 18:
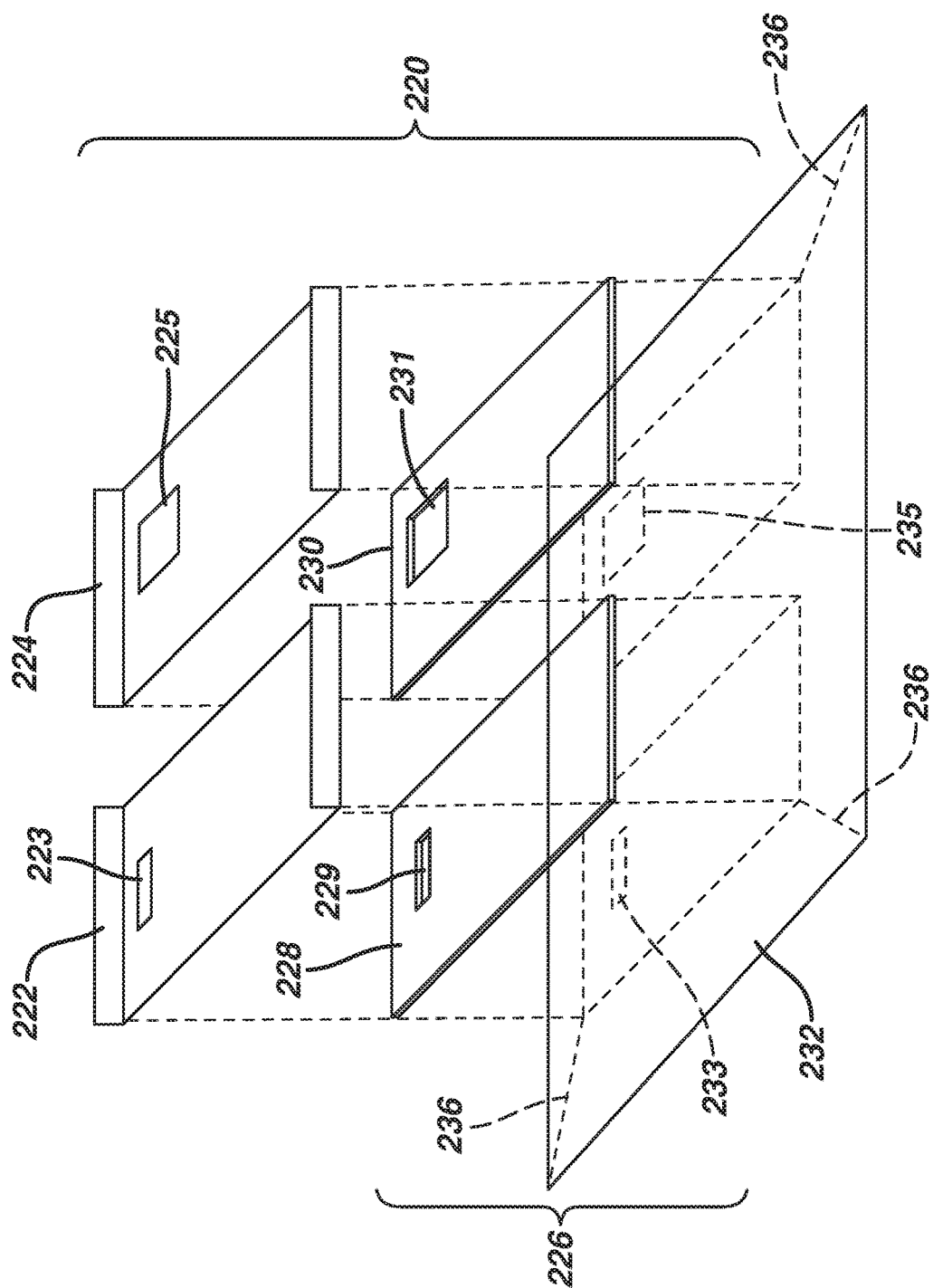
FIG. 18 is an exploded perspective view of a mobile phone holder arrangement prior to assembly according to one aspect of the invention.
Figure 19:
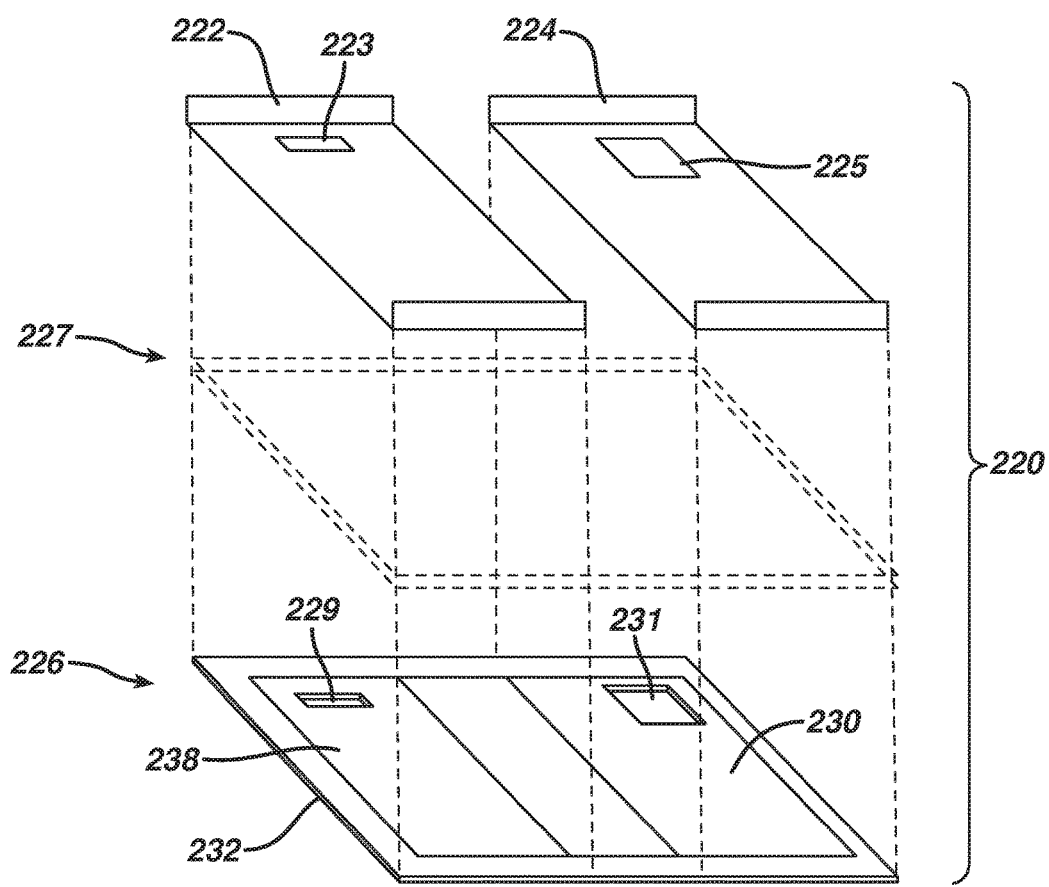
FIG. 19 is an exploded perspective view of the subsequent fabrication of the arrangement shown FIG. 18 to form a mobile phone holder according to one aspect of the invention.
Figure 20:
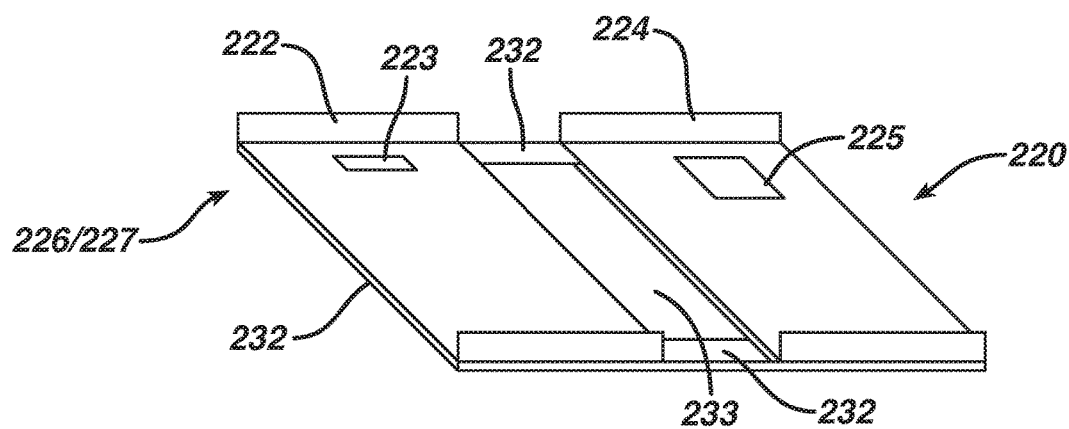
FIG. 20 is a perspective view of the subsequent fabrication of the arrangement shown FIG. 19 to form a mobile phone holder 220 according to one aspect of the invention.

FIGS. 18, 19, and 20 illustrate one method of fabricating aspects of the present invention. FIG. 18 is an exploded perspective view of a mobile phone holder arrangement 220 prior to assembly according to one aspect of the invention. As shown, the components of this aspect of the invention may include at least two mobile phone retaining devices 222 and 224 and a foldable structure 226 comprising at least two core panels 228 and 230 and an overlaid material or cover 232. Mobile phone retaining devices 222 and 224 may be any one of retaining devices disclosed herein, for example, any one of the devices disclosed and described with respect to FIGS. 24-26, for example, depending upon the mobile phones or other devices (not shown) mounted in devices 222 and 224. As shown in FIG. 18, retaining devices 222 and 224 may typically include at least one hole or aperture 223 and 225, respectfully, sized and positioned on retaining deices 222 and 224 to permit access to an input or output of the mobile phones, for example, a camera aperture.

The at least two core panels 228 and 230 may comprise a sheet or panel of any one of the core material disclosed herein, for example, any one or more of the plastics disclosed herein, any one or more of the metals disclosed herein, or a fiber or paper board. Similar to retaining devices 222 and 224, core panels 228 and 230 may also typically include at least one hole or aperture 229 and 231, respectfully, sized and positioned on core panels 228 and 230, and at least partially aligned with apertures 223 and 225, to permit access to an input or output of the mobile phones, for example, a camera aperture.

The overlaid material or cover 232 may be any sheet material disclosed herein, for example, any one of the plastics, woven or non-woven fabrics, or leather. Though only a single cover 232 is shown in FIG. 18, cover 232 may comprise two or more individual pieces, for example, two or more fabrics, or a fabric and a piece of leather. According to aspects of the invention, cover 232 may also typically include at least one hole or aperture 233 and 235, respectively, sized and positioned on cover 232, and at least partially aligned with apertures 223 and 225, respectively, and at least partially aligned with apertures 229 and 231, respectively, to permit access to an input or output of the mobile phones, for example, a camera aperture. As shown in FIG. 18, cover 232 may be cut as needed to accommodate the enveloping or wrapping of cover 32 about core panels 228 and 230. For example, cover 232 may be cut in numerous places as indicated by dash lines 236 to allow cover 232 to be wrapped around panels 228 and 230. The subsequent fabrication of a mobile phone holder according to an aspect of the invention is shown in FIG. 19.

FIG. 19 is an exploded perspective view of the subsequent fabrication of the arrangement 220 shown FIG. 18 to form a mobile phone holder according to one aspect of the invention. As shown, in this aspect, the periphery of cover 232 has been wrapped around the adjacent edges of core panels 228 and 230 and secured to panels 228 and 230, for example, with an adhesive and/or stitching. According to aspects of the invention, care is taken during the attachment of cover 232 to core panels 228 and 230 to ensure the at least partial alignment of apertures 229 and 231 in panels 228 and 230, respectively, and apertures 233 and 235 (see FIG. 18) in cover 232. Though foldable structure 226 is shown as a single construction in FIG. 19, it is also envisioned that foldable structure 226 may comprise two or more components, for example, two or more components comprising individual panels 228 and 230 each wrapped separately by covers 232. In another aspect, one or more foldable structures 227 (shown in phantom in FIG. 19), similar in structure and function to foldable structure 226, may be provided. For example, a foldable structure 227 may be provided to arrangement 220, but foldable structure 227 may be flipped over and mounted to foldable structure 226 (for example, by an adhesive, stitching, and/or staples) to provide a duplex foldable structure having exposed exterior covers 232 to which retaining devices 222 and 224 may be attached. The subsequent fabrication of a mobile phone holder according to an aspect of the invention is shown in FIG. 20.

FIG. 20 is a perspective view of the subsequent fabrication of the arrangement 220 shown FIG. 19 to form a mobile phone holder 220 according to one aspect of the invention. As shown, in FIG. 20, retaining devices 222 and 224 are mounted to foldable structure 226 (and 227, if present), typically with an adhesive to form holder or case 220. When mounted, retaining devices 222 and 224 may typically contact and conceal at least a portion of the cover 232. In one aspect, as shown in FIG. 20, the cover 232 which does not engage panels 228 and 230 and which is not concealed by retaining devices 222 and 224 my function as a spine 233 about which holder 220 may be folded. According to aspects of the invention, care is taken during the attachment of retaining devices 222 and 224 to core panels 228 and 230 (see FIG. 19) to ensure the at least partial alignment of apertures 223 and 235 in retaining devices 222 and 224, respectively, and apertures 229 and 231 (see FIG. 19) in core panels 228 and 230, respectively.

FIG. 21 is a perspective view of another mobile phone holder 240 in an opened position according to an aspect of the present invention. Similar to other aspects of the invention, holder 240 includes a foldable structure 242 comprising a first panel 244 and a second panel 246, a first mobile phone retaining device 248 mounted on the interior side of the first panel 244, and a second mobile phone retaining device 250 mounted on the interior side of the second panel 246. Holder 240 may include at least one third panel 247. Foldable structure 242 may have all the features and attributes of foldable structure 12 disclosed above, and mobile phone retaining devices 248 and 250 may have all the features and attributes of mobile phone retaining devices 26 and 28 disclosed above.

In the aspect shown in FIG. 21, mobile phone holder 240 also includes a flap or extension 252 mounted to foldable structure 242 that is rotatable as indicated by double arrow 253. Flap or extension 252 may comprise all the features and attributes of foldable structure 12 disclosed above. FIG. 22 is a perspective view of mobile phone holder 240 shown in FIG. 21 in the closed position, and FIG. 23 is a bottom view of mobile phone holder 240 shown in FIG. 21 in the closed position. FIG. 23 includes two representative mobile phones 249 and 251 in phantom lines.

In one aspect, flap 252 of foldable structure 242 may include one or more retaining or clasping devices 254 for securing flap 252 to foldable structure 242 when foldable structure 242 is folded into a closed position. In one aspect, the clasping device 254 may be any form of conventional device, such as, a mechanical clasp. In the aspect shown in FIGS. 21-23, the clasping device 254 comprises at least one strap 256 mounted to flap 252 having a fastener 258. As shown in FIG. 21, in one aspect, the fastener 258 may engage a complementary fastener 260 positioned on the exterior side of panel 244. Other clasping devices 254, for example, hook and loop fasteners or magnetic fasteners may also be used.

Figure 24:
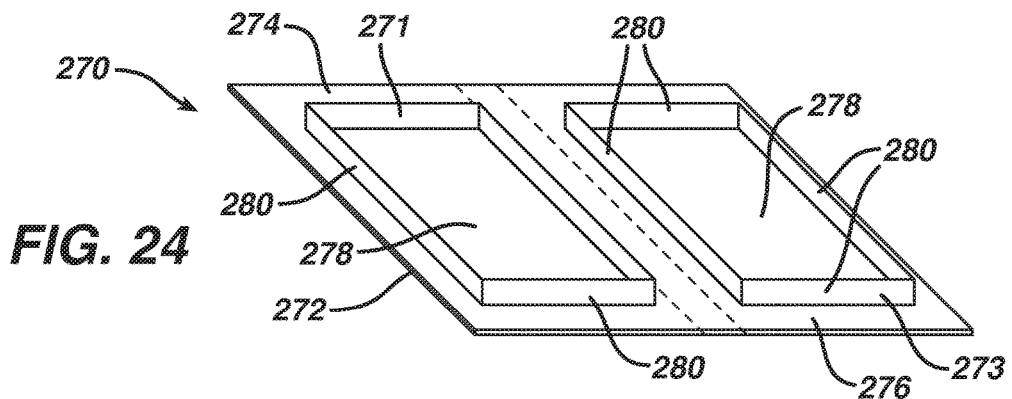
FIG. 24 is a perspective view of a mobile phone holder according to another aspect of the invention having mobile phone retainers according to an aspect of the invention.
Figure 25:
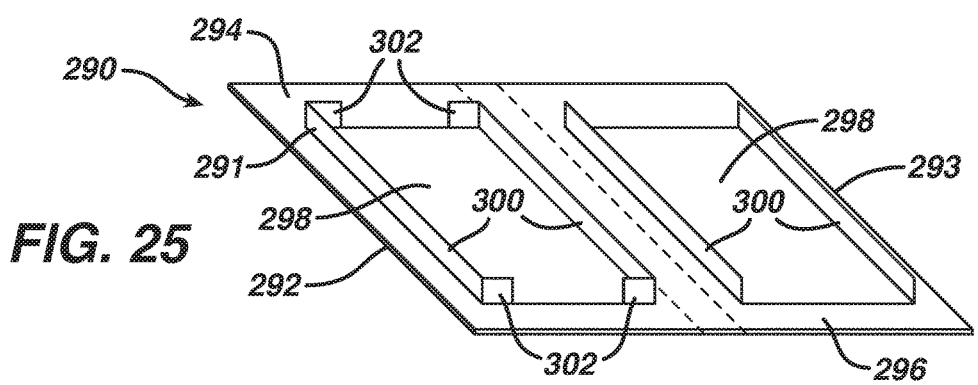
FIG. 25 is a perspective view of a mobile phone holder according to another aspect of the invention having mobile phone retainers according to an aspect of the invention.
Figure 26:
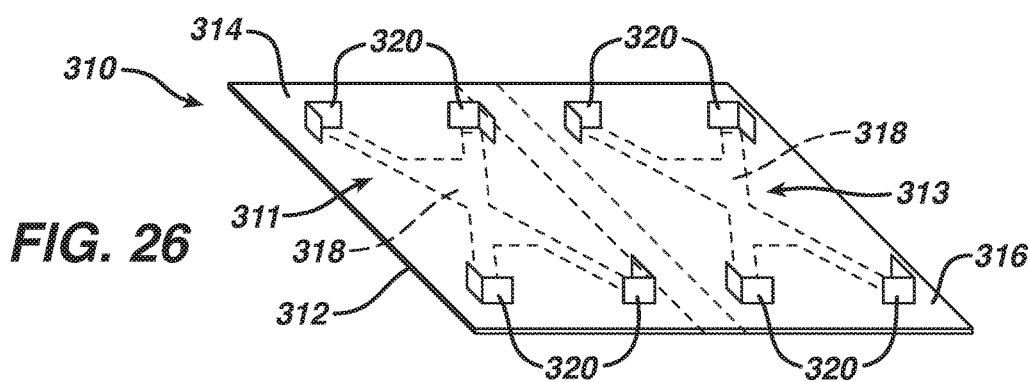
FIG. 26 is a perspective view of a mobile phone holder according to another aspect of the invention having mobile phone retainers according to an aspect of the invention.

FIGS. 24, 25, and 26 are perspective views of mobile phone holders having assorted mobile phone retaining devices that may be used with aspects of the present invention. FIG. 24 is a perspective view of mobile phone holder 270 according to another aspect of the invention having mobile phone retainers 271 and 273. Similar to other aspects of the invention, holder 270 includes a foldable structure 272 comprising a first panel 274 and a second panel 276. In this aspect, mobile phone retaining device 271 is mounted on the interior side of the first panel 274, and mobile phone retaining device 273 is mounted on the interior side of the second panel 276. Holder 270 may include at least one-third panel (not shown) mounted to foldable structure 272. Foldable structure 272 may have all the features and attributes of foldable structure 12 disclosed above, and mobile phone retaining devices 271 and 273 may have all the features and attributes of mobile phone retaining devices 26 and 28 disclosed above.

In this aspect, both mobile phone retaining devices 271 and 273 each include a back plate 278 and four sides 280 projecting from back plate 278. Sides 280 may be sized and shaped to engage and retain a mobile phone (not shown). For example, though shown generally straight in FIG. 24, sides 280 may comprise shaped (for example, curved) surfaces adapted to conform to (for example, snuggly conform to) the opposing curved sides of a mobile phone to engage and retain the mobile phone. Though not shown in FIG. 24, retaining devices 271 and 273 may include one or more holes, apertures, or perforations to provide unobstructed access to the ports and devices in mobile phones mounted in retaining devices 271 and 273. Back plate 278 and sides 280 may be made from one or more of the materials disclosed herein, for example, a plastic or a metal, and have the dimensions disclosed herein. Retaining devices 271 and 273 may be mounted to foldable structure 272 by conventional means, for example, with an adhesive.

FIG. 25 is a perspective view of mobile phone holder 290 according to another aspect of the invention having mobile phone retainers 291 and 293. Similar to other aspects of the invention, holder 290 includes a foldable structure 292 comprising a first panel 294 and a second panel 296. In this aspect, mobile phone retaining device 291 is mounted on the interior side of the first panel 294, and mobile phone retaining device 293 is mounted on the interior side of the second panel 296. Holder 290 may include at least one-third panel (not shown) mounted to foldable structure 292. Foldable structure 292 may have all the features and attributes of foldable structure 12 disclosed above, and mobile phone retaining devices 291 and 293 may have all the features and attributes of mobile phone retaining devices 26 and 28 disclosed above.

In this aspect, both mobile phone retaining devices 291 and 293 each include a back plate 298 and two sides substantially sides 300 and partial sides 302 projecting from back plate 298. Sides 300 and 302 may be sized and shaped to engage and retain a mobile phone (not shown). For example, though shown generally straight in FIG. 25, sides 300 and 302 may comprise shaped (for example, curved) surfaces adapted to conform to (for example, snuggly conform to) the opposing curved sides of a mobile phone to engage and retain the mobile phone. Though not shown in FIG. 25, retaining devices 291 and 293 may include one or more holes, apertures, or perforations to provide unobstructed access to the ports and devices in mobile phones mounted in retaining devices 291 and 293. Back plate 298 and sides 300 and 302 may be made from one or more of the materials disclosed herein, for example, a plastic or a metal, and have the dimensions disclosed herein. Retaining devices 291 and 293 may be mounted to foldable structure 292 by conventional means, for example, with an adhesive.

FIG. 26 is a perspective view of mobile phone holder 310 according to another aspect of the invention having mobile phone retainers 311 and 313. Similar to other aspects of the invention, holder 310 includes a foldable structure 312 comprising a first panel 314 and a second panel 316. In this aspect, mobile phone retaining device 311 is mounted on the interior side of the first panel 314, and mobile phone retaining device 313 is mounted on the interior side of the second panel 316. Holder 310 may include at least one third panel (not shown) mounted to foldable structure 312. Foldable structure 312 may have all the features and attributes of foldable structure 12 disclosed above, and mobile phone retaining devices 311 and 131 may have all the features and attributes of mobile phone retaining devices 26 and 28 disclosed above.

In this aspect, both mobile phone retaining devices 311 and 313 each include a back plate 318 embedded in or mounted on panels 314 and 316, for example, comprising a core material as disclosed herein, and four corner retainers 320 projecting from back plate 318 above the surface of panels 314 and 316. Embedded or attached back plate 318 may assume many difference shapes while providing a support for corner retainers 320. For example, though back plates 318 are shown having a generally X-shaped profile, embedded black plates 318 may be rectangular, square, circular, or oval, among other shapes, in profile while providing the desired support for corner retainers 320. In this aspect, three or more, typically, four or more, corner retainers 320 are provided to engage a mobile phone or device and back plate 318 is provided to support and position corner retainers 320 as needed. In one aspect, back plate 318 may not be needed, and three or more, typically, four or more, corner retainers 320 mounted in or on foldable structure 312 may be sufficient to retain one or more mobile phones on foldable structure 312. In one aspect, when back plates 318 are embedded in foldable structure 312, only the three or more corner retainers 320 may project (and thus be visible) above the surface of foldable structure 312. In other aspects, foldable structure 312 may be at least partially transparent where back plates 318 (if present) may be at least partially visible beneath the surface of foldable structure 312. In one aspect, corner retainers 320 and/or back plates 318 may be fabricated in a plastic using 3D printer technology.

Corner retainers 320 may be sized and shaped to engage and retain a mobile phone (not shown). For example, though shown generally straight in FIG. 26, corner retainers 320 may comprise shaped (for example, curved) surfaces adapted to conform to (for example, snuggly conform to) the opposing curved sides of a mobile phone to engage and retain the mobile phone. Though not shown in FIG. 26, retaining devices 311 and 313 may include one or more holes, apertures, or perforations to provide unobstructed access to the ports and devices in mobile phones mounted in retaining devices 311 and 313. Back plate 318 and corner retainers 320 may be made from one or more of the materials disclosed herein, for example, a plastic or a metal, and have the dimensions disclosed herein. Retaining devices 311 and 313 may be mounted to foldable structure 312 by conventional means, for example, with an adhesive.

Figure 27:
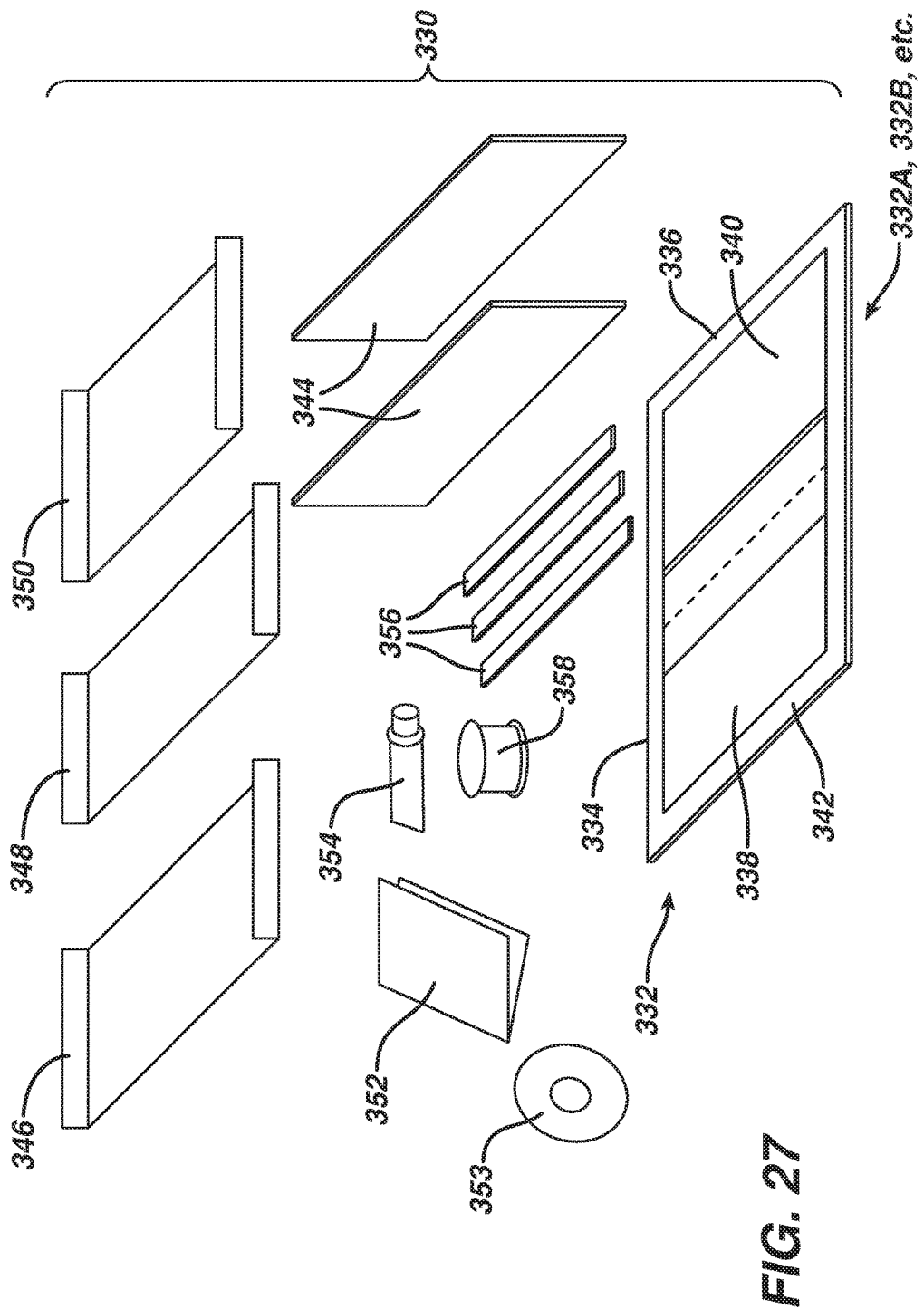
FIG. 27 is a schematic perspective view of an arrangement of components of a kit according to an aspect of the invention.

FIG. 27 illustrates a still further aspect of the invention. FIG. 27 is a schematic perspective view of an arrangement 330 of components of an aspect of the invention that can be provided to a consumer, for example, as a kit 330 for assembly by the consumer. For example, the kit 330 may be provided to a consumer having two or more mobile phones and the kit 330 may be used by the consumer to assemble a holder according to aspects of the invention depending upon the mobile phones (or other devices) used by the consumer.

As shown in FIG. 27, kit 330 may include a foldable structure 332 comprising a first panel 334 and a second panel 336. Though various foldable structures as disclosed herein may be provided, with or without flaps or straps, in this aspect shown in FIG. 27, foldable structure 332 includes two core panels 338 and 340 enveloped by a cover 342, as disclosed herein. Kit 330 may include one or more third panels 344 that may be mounted to foldable structure 332 and two or more mobile phone retaining devices 346, 348, and 350 that may be mounted to foldable structure 332. As shown in FIG. 27, retaining devices 346, 348, and 350, among others may be provided with varying sizes or shapes to be used at the discretion of the consumer to construct the desired holder. Mobile phone retaining devices may comprise any one or more of the retaining devices disclosed herein. In one aspect, a plurality of apertures or holes may be provided in retaining devices 346, 348, and 350 and in foldable structure 332 to provide access ports and devices of the mobile phones used. In another aspect, instructions may be provided to locate and cut these holes or apertures in retaining devices and foldable structures provided without such holes or apertures. In one aspect, foldable structure 332 may be provided by two or more sub-structures 332A, 332B, etc. comprising a first panel 334, a second panel 336, a third panel (not shown), etc., for example, each panel having a core panel 338, 340 enveloped by a cover 342, as disclosed herein. Sub-structures 332A, 332B, etc. may be fabricated into a foldable structure 332 as disclosed herein, for example, with an adhesive, stitching, staples, and/or hook and loop fasteners.

The kit 330 may also include one or more instruction manuals 352 or a digital disc 353 (for example, a compact disc or a video disc) providing detailed instructions on the assembly of aspects of the invention provided with the kit. Kit 330 may also include means for mounting or attaching or assembling the components provided with the kit, for example, a tube of adhesive 354, a plurality of hook a loop fasteners 356, and/or thread 358, among others.

FIG. 27 also illustrates a further aspect of the invention in which components, such as, foldable structure 332, panels 334 and 336, third panels 344, and phone retainers 346, 348, and 350, may be provided individually or as a kit and then assembled, for example, releasably assembled. In one aspect, one or more foldable structures 332; one or more panels 334, 336, and 344; one or more phone retainers 346, 348, and 350; and/or one or more flaps or extensions (not shown) may be releasably assembled, for example, using hook and loop fasteners 356 or other releasable fasteners to allow various arrangements of components, for example, the "mixing and matching" of components. In this aspect, one or more foldable structures 332, one or more panels 334, 336, and 344, and one or more retainers 346, 348, and 350 may be provided with similar or varying designs or patterns and these components may be releasable assembled, for example, with Velcro® type fasteners, with consistent or varying patterns.

It will be apparent from the above disclosure that mobile device holders, specifically, mobile phone holders, and methods are provided that allow a user to handle and use multiple devices at substantially the same time. Aspects of the invention contrast with prior art holders and methods that are limited to permitting use and access of only a single phone or device. As discussed above, though aspects of the invention may be uniquely adapted for use with conventional mobile phones, for example, "smart phones", such as those provided by Apple and Samsung, aspects of the invention can be used for any mobile electronic device or any mobile non-electronic device that benefits by permitting substantially simultaneous use or access. These mobile electronic devices include personal digital assistants, video players, music players, electronic books ("e-books"), electronic tablets, and computers, among other electronic devices.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "including," and/or "having" when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical applications, and to enable others of ordinary skill in the art to understand the disclosure for various embodiments with various modifications as are suited to the particular use contemplated.

This written description uses examples to disclose the invention, including the best mode envisioned, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A portable mobile phone holder comprising:
a foldable structure comprising a first panel and a second panel, wherein at least one of the first panel and the second panel is rotatable between a closed position and one or more open positions, and wherein, in the closed position, an interior side of the first panel faces an interior side of the second panel;
a first mobile phone retaining device mounted on the interior side of the first panel; and
a second mobile phone retaining device mounted on the interior side of the second panel;

wherein, when the foldable structure is positioned in an open position, the first mobile phone retaining device and the second mobile phone retaining device are accessible; and wherein the first mobile phone retaining device and the second mobile phone retaining device each comprise an enclosure shaped to engage a mobile phone, wherein each enclosure comprises a lateral dimension less than a corresponding lateral dimension of one of the first panel and the second panel.

2. The holder as recited in claim 1, wherein, when a first mobile phone is mounted in the first mobile phone retaining device and a second mobile phone is mounted in the second mobile phone retaining device, and wherein the foldable structure is positioned in the open position, a user interface of each of the first mobile phone and of the second mobile phone is accessible by a user.

3. The holder as recited in claim 1, wherein the foldable structure further comprises at least one third panel mounted to the structure.

4. The holder as recited in claim 3, wherein the at least one third panel is mounted between the first panel and the second panel.

5. The holder as recited in claim 3, wherein the at least one third panel is mounted to a periphery of one of the first panel and the second panel.

6. The holder as recited in claim 1, wherein the first panel and the second panel each comprise a core structure and an overlaid material.

7. The holder as recited in claim 6, wherein the overlaid material comprises at least one of a fabric, a leather, and a plastic.

8. The holder as recited in claim 1, wherein the foldable structure further comprises at least one cavity.

9. The holder as recited in claim 8, wherein the at least one cavity comprises at least one of a purse and a card holder.

10. The holder as recited in claim 1, wherein the enclosure shaped to engage a mobile phone comprises opposing sides shaped to conform to a shape of sides of a mobile phone.

11. A method for operating at least two mobile phones, the method comprising:
providing a foldable structure comprising a first panel and a second panel, wherein at least one of the first panel and the second panel is rotatable between a closed position and one or more open positions, and wherein, in the closed position, an interior side of the first panel faces an interior side of the second panel;
inserting a first mobile phone into a first mobile phone retaining device mounted on the interior side of the first panel, wherein the first mobile phone retaining device comprises a first enclosure shaped to engage a mobile phone, and wherein the first enclosure comprises a lateral dimension less than a corresponding lateral dimension of the first panel;
inserting a second mobile phone into a second mobile phone retaining device mounted on the interior side of the second panel, wherein the second mobile phone retaining device comprises a second enclosure shaped to engage a mobile phone, and wherein the second enclosure comprises a lateral dimension less than a corresponding lateral dimension of the second panel;
rotating at least one of the first panel and the second panel into one of the one or more open positions; and
accessing a user interface of the first mobile phone and accessing a user interface of the second mobile phone.

12. The method of claim 11, wherein accessing the user interface of the first mobile phone and accessing the user interface of the second mobile phone comprises substantially simultaneously accessing the user interface of the first mobile phone and the user interface of the second mobile phone.

13. The method as recited in claim 11, wherein the method further comprises activating at least one of the first mobile phone and the second mobile phone.

14. The method as recited in claim 11, wherein the method further comprises preventing contact between the first mobile phone and the second mobile phone.

15. The method as recited in claim 14, wherein the foldable structure further comprises a third panel, and wherein preventing contact between the first mobile phone and the second mobile phone comprises positioning the third panel between the first mobile phone and the second mobile phone.

16. A portable electronic device holder kit comprising:
a foldable structure comprising a first panel and a second panel, wherein at least one of the first panel and the second panel is rotatable between a closed position and one or more open positions, and wherein, in the closed position, an interior side of the first panel faces an interior side of the second panel;
at least two electronic device retaining devices, the at least two electronic device retaining devices each comprising an enclosure shaped to engage an electronic device, wherein each enclosure comprises a lateral dimension less than a corresponding lateral dimension of one of the first panel and the second panel; and
a mounting for each enclosure to the foldable structure.

17. The kit as recited in claim 16, wherein the electronic device comprises a mobile phone.

18. The kit as recited in claim 16, wherein the mounting for each enclosure to the foldable structure comprises at least one of an adhesive, thread, and hook and loop fasteners.

19. The kit as recited in claim 16, wherein the kit further comprises at least one third panel mountable to the foldable structure.

20. The kit as recited in claim 16, wherein the kit further comprises at least one instruction manual or digital disc.

* * * * *